(12) United States Patent
Murakami et al.

(10) Patent No.: US 10,981,617 B2
(45) Date of Patent: Apr. 20, 2021

(54) INVERTED PENDULUM TYPE VEHICLE

(71) Applicant: HONDA MOTOR CO., LTD., Tokyo (JP)

(72) Inventors: Hideo Murakami, Saitama (JP);
Kazumasa Ozaki, Saitama (JP);
Tomohiro Kawakami, Saitama (JP);
Kazushi Akimoto, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 454 days.

(21) Appl. No.: 15/957,216

(22) Filed: Apr. 19, 2018

(65) Prior Publication Data

US 2018/0304954 A1    Oct. 25, 2018

(30) Foreign Application Priority Data

Apr. 24, 2017  (JP) .............................. JP2017-085596

(51) Int. Cl.
*B62K 11/00* (2006.01)
*B62K 1/00* (2006.01)
(Continued)

(52) U.S. Cl.
CPC .............. *B62K 11/007* (2016.11); *B62K 1/00* (2013.01); *B62K 11/14* (2013.01); *B62K 23/06* (2013.01); *B62J 45/40* (2020.02)

(58) Field of Classification Search
None
See application file for complete search history.

(56) References Cited

U.S. PATENT DOCUMENTS

2010/0071984 A1*  3/2010  Doi ....................... B62K 11/007
                                                            180/218
2010/0168993 A1*  7/2010  Doi ....................... B62K 11/007
                                                            701/124
(Continued)

FOREIGN PATENT DOCUMENTS

JP        2008-99346 A      4/2008
JP        2011-105072       6/2011
JP        2013-237324      11/2013

OTHER PUBLICATIONS

Chenguang; Trajectory Planning and Optimized Adaptive Control for a Class of Wheeled Inverted Pendulum Vehicle Models; Feb. 2013; IEEE Transactions on Cybernetics, vol. 43, No. 1; https://ieeexplore.ieee.org/abstract/document/6213566 (Year: 2013).*

*Primary Examiner* — David P. Merlino
(74) *Attorney, Agent, or Firm* — Rankin, Hill & Clark LLP

(57) ABSTRACT

Provided is an inverted pendulum type vehicle. A controller (20) includes a reference desired motion determiner (211), which sequentially determines a reference desired motion of a traveling motion unit (3) so as to stabilize the attitude of an object mounting unit (5), high-frequency idling state amount calculators (214), (42a) and (42b), which calculate the high-frequency idling state amount of the traveling motion unit (3), and a desired motion corrector (42g), which corrects the reference desired motion by a correction amount determined on the basis of the high-frequency idling state amount to reduce a high-frequency component of idling. The controller (20) controls an actuator unit (8) according to the desired motion obtained by correcting the reference desired motion.

4 Claims, 13 Drawing Sheets

(51) Int. Cl.
B62K 11/14 (2006.01)
B62K 23/06 (2006.01)
B62J 45/40 (2020.01)

(56) References Cited

U.S. PATENT DOCUMENTS

2010/0179749 A1* 7/2010 Kajima ................ B62K 11/007
  701/124
2011/0048829 A1* 3/2011 Matsumoto ........... F16H 61/437
  180/197

* cited by examiner

INVERTED PENDULUM TYPE VEHICLE

BACKGROUND OF THE INVENTION

Field of the Invention

The present invention relates to an inverted pendulum type vehicle.

Description of the Related Art

Hitherto, there has been known an inverted pendulum type vehicle described in, for example, Japanese Patent Application Laid-Open No. 2013-237324 (hereinafter referred to as "Patent Document 1") and Japanese Patent Application Laid-Open No. 2011-105072 (hereinafter referred to as "Patent Document 2"). This type of inverted pendulum type vehicle has a traveling motion unit capable of traveling on a floor surface, an actuator unit that drives the traveling motion unit, a base to which the traveling motion unit and the actuator unit are assembled, an object mounting unit (a part on which a rider mounts or an object to carry is mounted) which is assembled to the base and tiltable with respect to the vertical direction, and a controller that controls the operation of the actuator unit.

In the inverted pendulum type vehicle, the travel control of the traveling motion unit is conducted basically to stabilize the attitude of the object mounting unit.

Stabilizing the attitude of the object mounting unit means to maintain the overall center of gravity (the center of gravity of the entire vehicle, including an object mounted on the object mounting unit), which moves whenever the attitude (posture) of the object mounting unit of the inverted pendulum type vehicle changes, in a balanced state just like the mass point of an inverted pendulum.

In this case, the balanced state more specifically means a dynamically balanced state in which the moment (a moment in the direction about a horizontal axis) generated in the vehicle by the gravitational force acting on the overall center of gravity, an inertial force (centrifugal force or the like) acting on the overall center of gravity, and a reaction force (drag force) applied to the vehicle from a floor surface is zero or approximately zero.

When the inverted pendulum type vehicle travels, in a situation in which, for example, the traveling motion unit is moved to ride over a step or a projection on a floor surface, there are cases where the traveling motion unit runs idle due to a slippage between the traveling motion unit and the floor surface. Such idling of the traveling motion unit prevents the traveling motion unit from traveling at a proper travel velocity.

Patent Documents 1 and 2 propose a technique for stopping a traveling motion unit (Patent Document 1) or a technique for gradually decreasing a desired travel velocity of the traveling motion unit (Patent Document 2) in the case where the occurrence of idling is detected.

However, various experiments or studies performed by the inventors of the present application have disclosed that the conventional techniques described in Patent Documents 1 and 2 present the following inconveniences.

According to the techniques described in the foregoing Patent Documents 1 and 2, in order to detect the occurrence of the idling of the traveling motion unit, an inertial sensor including an acceleration sensor is used to estimate the actual travel velocity of the overall center of gravity of the traveling motion unit or the vehicle.

In this case, the estimated value of the actual travel velocity of the overall center of gravity of the traveling motion unit or the vehicle is apt to include a steady (or a low-frequency range) error mainly because of the influence of the output drift of the acceleration sensor or the integration error of acceleration detection values. Further, according to the techniques described in the foregoing Patent Documents 1 and 2, the estimated value of the travel velocity that includes such an error is used to detect the occurrence of the idling of the traveling motion unit, so that the occurrence of idling tends to be frequently or continually detected. This inconveniently leads to frequent occurrence of a situation in which the travel of the vehicle is prevented due to such detection of idling.

SUMMARY OF THE INVENTION

The present invention has been made in light of the background described above, and it is an object of the invention to provide an inverted pendulum type vehicle capable of maximizing the continuance of normal travel motion of the vehicle by properly controlling a traveling motion unit when the idling of the traveling motion unit occurs.

An inverted pendulum type vehicle in accordance with the present invention is an inverted pendulum type vehicle having a traveling motion unit capable of traveling on a floor surface, an actuator unit that drives the traveling motion unit, a base to which the traveling motion unit and the actuator unit are assembled, an object mounting unit assembled to the base such that the object mounting unit is tiltable with respect to a vertical direction, and a control unit that controls an operation of the actuator unit, the inverted pendulum type vehicle including:

a reference desired motion determiner that sequentially determines a reference desired motion, which is a reference desired motion of the traveling motion unit and which stabilizes an attitude of the object mounting unit;

a high-frequency idling state amount calculating unit that sequentially calculates a high-frequency idling state amount which is a high-frequency component of a predetermined frequency or more of a velocity difference between a measurement value of an actual travel velocity of the traveling motion unit and an estimated value of a no-slip state travel velocity, which is an estimated value of the travel velocity of the traveling motion unit defined according to an operation state of the actuator unit in a case where it is assumed that there is no slip between the traveling motion unit and the floor surface, or a high-frequency idling state amount, which is a high-frequency component of the predetermined frequency or more of a velocity difference function value having a function characteristic that monotonically changes in relation to the velocity difference; and a desired motion correction unit which corrects the reference desired motion by a correction amount which is determined based on the high-frequency idling state amount and which reduces the frequency component of the velocity difference, wherein the control unit is configured to control the actuator unit according to a desired motion obtained by correcting the reference desired motion by the desired motion correction unit (a first aspect of the invention).

A supplemental description will be given of the terminology in the present invention. The word "floor surface" includes a ground surface, a road surface or the like in addition to a floor surface in the normal sense.

Further, the phrase "the actual travel velocity of the traveling motion unit" means the actual travel velocity of the traveling motion unit with respect to the foregoing "floor surface."

Further, for "the reference desired motion of the traveling motion unit," a desired value of the travel velocity (translational velocity) of the traveling motion unit or a travel acceleration (translational acceleration) of the traveling motion unit can be used.

The phrase "velocity difference function value having a function characteristic that monotonically changes in relation to a velocity difference" means the function value of the velocity difference and more specifically means a function value that changes by monotonically increasing or monotonically decreasing in relation to the velocity difference.

According to the first aspect of the invention, the reference desired motion of the traveling motion unit is corrected by a correction amount determined on the basis of the high-frequency idling state amount. If the idling of the traveling motion unit actually occurs, then the velocity difference or the velocity difference function value relatively promptly changes usually immediately after the occurrence of the idling, thus causing the high-frequency idling state amount to relatively markedly increase. Hence, the desired motion after a correction can be determined to promptly reduce the high-frequency component of the velocity difference by correcting the reference desired motion by a correction amount determined on the basis of the high-frequency idling state amount. Further, the actuator unit is controlled according to the desired motion that has been corrected.

Thus, the idling of the traveling motion unit is promptly dissolved or reduced. As a result, the traveling motion unit can be moved in the reference desired motion or a motion state close thereto.

Meanwhile, even if the velocity difference has a steady error component due to a steady error or the like of the measurement value of an actual travel velocity of the traveling motion unit, the error component is not reflected in the high-frequency idling state amount. Therefore, in a situation in which no actual idling of the traveling motion unit has occurred or the idling remains subtle, the high-frequency idling state amount will be zero or very small even when the error component is relatively large. As a result, the correction amount is determined such that the desired motion of the traveling motion unit after making a correction based on the correction amount coincides or substantially coincides with a reference desired motion. Hence, the traveling motion unit is controlled through the intermediary of the actuator unit such that the traveling motion unit travels in a motion state that coincides or substantially coincides with the reference desired motion.

Thus, according to the first aspect of the invention, if the occurrence of the actual idling of the traveling motion unit is marked, then the idling can be promptly cleared or reduced, and if no idling of the traveling motion unit has occurred or if the idling is subtle, then the traveling motion unit can be moved in a motion state that coincides or substantially coincides with a reference desired motion. Therefore, according to the first aspect of the invention, the traveling motion unit can be properly controlled when idling occurs, thus enabling the vehicle to continuously perform normal travel motion to the maximum extent possible.

In the first aspect of the invention described above, the desired motion correction unit may be configured to determine the correction amount of the reference desired motion according to one or more parameters, which are a value of the high-frequency idling state amount, a differential value of the high-frequency idling state amount, a value of the integral of the high-frequency idling state amount, and a polarity of the high-frequency idling state amount (a second aspect of the invention).

This arrangement makes it possible to achieve a desired motion characteristic of an inverted pendulum type vehicle when the idling of the traveling motion unit occurs.

In the first aspect or the second aspect of the invention described above, the desired motion correction unit may be configured to correct the reference desired motion, provided that a predetermined condition regarding a drive state of the traveling motion unit is satisfied (a third aspect of the invention).

With this arrangement, a correction of the reference desired motion can be made on the basis of the high-frequency idling state amount only in the case where the drive state of the traveling motion unit is highly in need for the correction.

In the third aspect of the invention described above, a condition in which, for example, the drive state of the traveling motion unit is a state in which a driving force applied from the actuator unit to the traveling motion unit is increasing, is ideally adopted as the predetermined condition (a fourth aspect of the invention).

More specifically, the idling of the traveling motion unit tends to markedly occur when the driving force applied to the traveling motion unit is increasing. Further, in the inverted pendulum type vehicle, the state in which the driving force is increasing is a state in which the travel velocity of the traveling motion unit is being increased in order to stabilize the attitude of the object mounting unit. Hence, if the idling of the traveling motion unit occurs in such a state, then the driving force applied to the traveling motion unit is further increased, thus leading to a likelihood of an increased idling.

Accordingly, if the idling occurs when the driving force applied to the traveling motion unit is increasing, it is desired to promptly resolve or reduce the idling as much as possible thereby to restore a state that enables the traveling motion unit to properly travel. The fourth aspect of the invention makes it possible to ideally meet such a requirement.

In the first to the fourth aspects of the invention, the high-frequency idling state amount calculating unit may be configured to calculate the high-frequency idling state amount typically by sequentially carrying out processing for determining the velocity difference or a velocity difference function value and carrying out low-cut characteristic (or high-pass characteristic) filtering on the velocity difference or the velocity difference function value. Alternatively, however, the following mode may be adopted.

A mode may be adopted, in which the high-frequency idling state amount calculating unit is configured to, for example, sequentially carry out, at a predetermined arithmetic processing cycle, first processing for measuring an actual translational acceleration of the traveling motion unit by using a detection signal of an inertial sensor, which includes at least an acceleration sensor mounted on the inverted pendulum type vehicle, second processing for calculating an estimated value of a translational acceleration of the traveling motion unit by integrating a difference between a measurement value of the translational acceleration and a value obtained by multiplying the high-frequency component of the calculated velocity difference by a gain of a predetermined value, and third processing for calculating a difference between the translational velocity and an estimated value of the no-slip state travel velocity as a high-frequency component of the velocity difference, and the value of the gain is set beforehand such that the high-frequency component of the velocity difference calculated by the third processing will be a high-frequency component of a frequency range of the predetermined frequency or more (a fifth aspect of the invention).

With this arrangement, the high-frequency idling state amount can be calculated from the measurement value of the actual translational acceleration of the traveling motion unit obtained by measurement using a detection signal of the inertial sensor and the estimated value of the no-slip state travel velocity without directly using the low-cut characteristic (or the high-pass characteristic) filtering.

The estimated value of the no-slip state travel velocity can be determined from, for example, an observation value or a desired value of the operation state of the actuator unit (e.g. the rotational velocity of the output shaft of the actuator unit). If, as an alternative, the desired value of the travel velocity of the traveling motion unit is sequentially determined as the desired motion of the traveling motion unit in order to control the actuator unit according to the desired value, then a latest value among, for example, the determined desired values of the travel velocity of the traveling motion unit (the desired values already used for controlling the actuator unit) may be obtained as the estimated value of the no-slip state travel velocity.

DESCRIPTION OF THE PREFERRED EMBODIMENTS

First Embodiment

Figure 1:
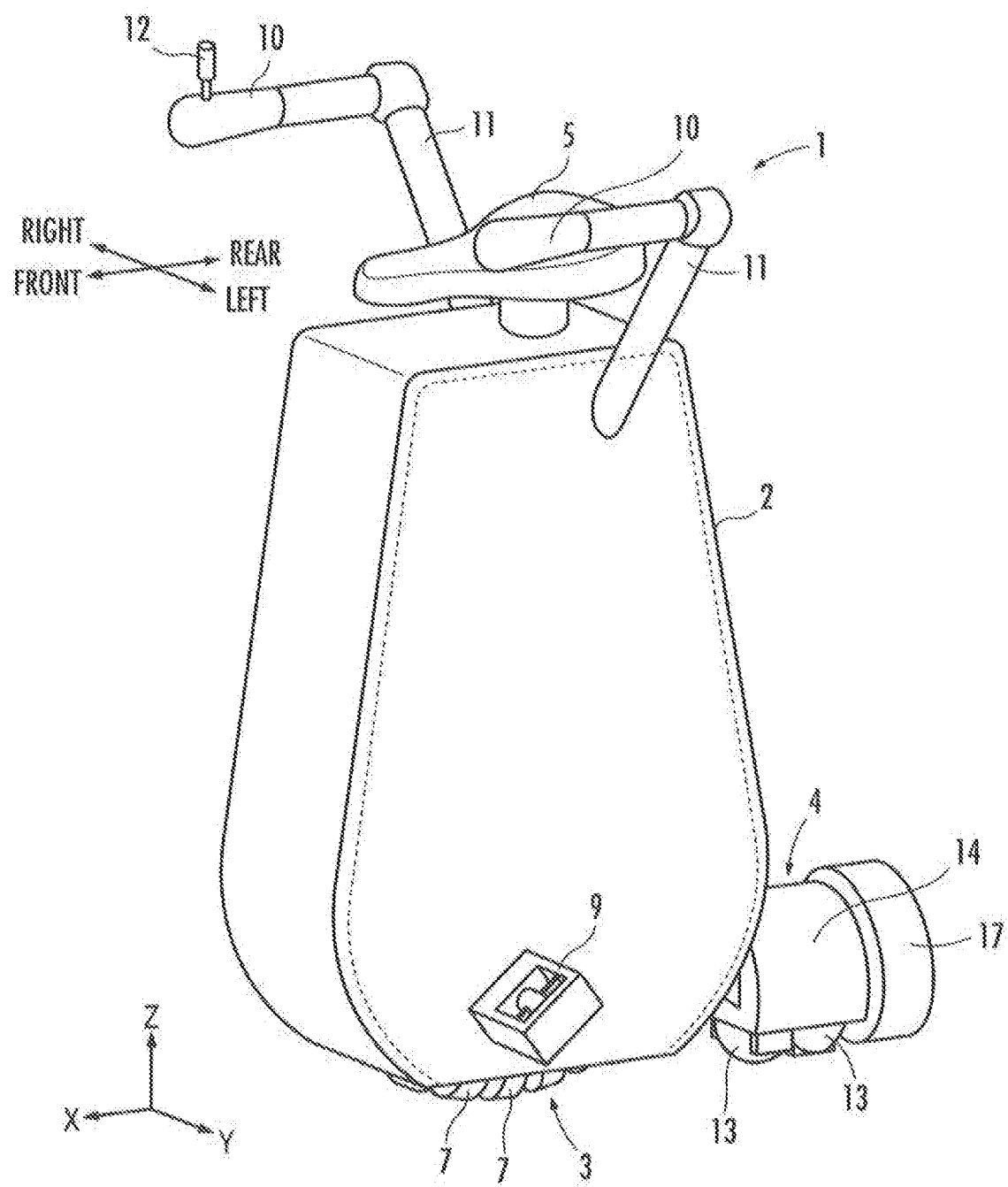
FIG. 1 is a perspective view of an inverted pendulum type vehicle according to an embodiment of the present invention.
Figure 2:
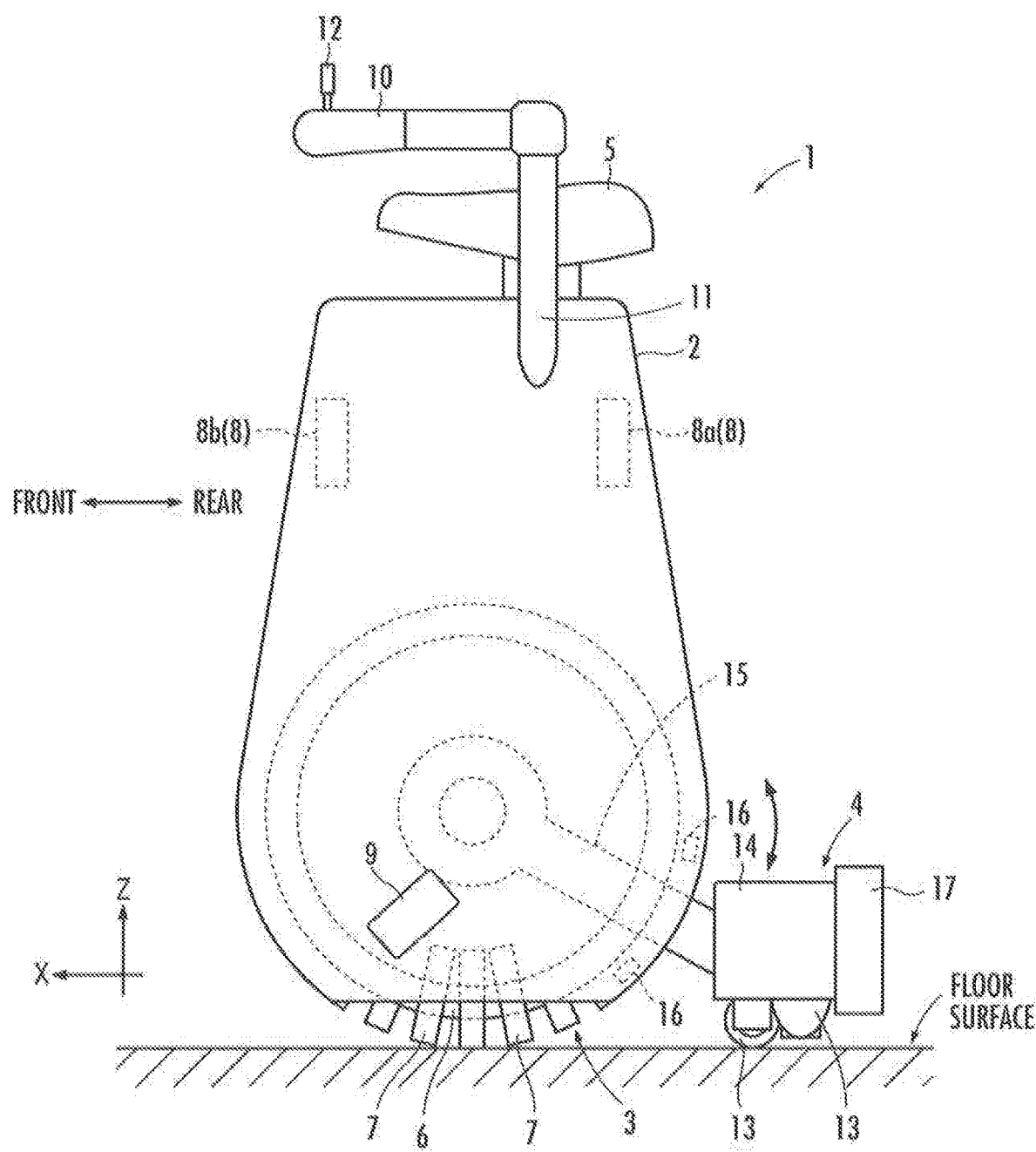
FIG. 2 is a side view of the inverted pendulum type vehicle according to the embodiment of the present invention.

A first embodiment of the present invention will be described with reference to FIG. 1 to FIG. 13. Referring to FIG. 1 and FIG. 2, an inverted pendulum type vehicle 1 (hereinafter may be referred to simply as "the vehicle 1") according to the present embodiment includes a base frame 2, a first traveling motion unit 3 and a second traveling motion unit 4, which are capable of traveling on a floor surface, and a saddle unit 5 on which a rider mounts.

The first traveling motion unit 3 includes a ring-shaped core member 6 (hereinafter referred to as "the annular core 6") illustrated in FIG. 2 and a plurality of annular rollers 7, which are attached to the annular core 6 and which are arranged at equiangular intervals in the circumferential direction (the direction about the axis) of the annular core 6. The rollers 7 are externally inserted in the annular core 6 with the rotational axes thereof directed in the circumferential direction of the annular core 6. Further, the rollers 7 are made rotatable integrally with the annular core 6 about the axis of the annular core 6. In addition, each of the rollers 7 is made rotatable about the central axis of the cross-section of the annular core 6 (the axis of circumference, the axis of the annular core 6 being the center thereof).

The first traveling motion unit 3 having the annular core 6 and the plurality of rollers 7 can be grounded on a floor surface through the rollers 7 (the rollers 7 being positioned at the lower portions of the annular core 6), the axis of the annular core 6 being directed in parallel (or substantially parallel) to the floor surface, as illustrated in, for example, FIG. 1 and FIG. 2. In this grounded state, rotationally driving the annular core 6 about the axis thereof causes the annular core 6 and all the rollers 7 to roll. Thus, the first traveling motion unit 3 travels on the floor surface in a direction that is orthogonal to the axis of the annular core 6 (more specifically, in the direction that is orthogonal to the direction of the axis of the annular core 6 projected onto the floor surface). Further, in the grounded state, rotationally driving the rollers 7 about the rotational axis thereof causes the first traveling motion unit 3 to travel in the axial direction of the annular core 6 (more specifically, in the direction of the axis of the annular core 6 projected onto the floor surface).

Further, rotationally driving the annular core 6 and also rotationally driving the rollers 7 cause the first traveling motion unit 3 to travel in the direction that is orthogonal to the axis of the annular core 6 and in a direction at an angle with respect to the axial direction of the annular core 6.

Thus, the first traveling motion unit 3 can travel in every direction on the floor surface. In the following description, among the travel directions of the first traveling motion unit 3 (the travel directions observed as projected on a horizontal plane), the direction that is orthogonal to the axis of the annular core 6 will be defined as an X-axis direction, the axial direction of the annular core 6 will be defined as a Y-axis direction, and the vertical direction will be defined as a Z-axis direction, as illustrated in FIG. 1 and FIG. 2. The XYZ coordinate system corresponds to a so-called global coordinate system. The forward direction of the vehicle 1 will be defined as the positive direction of the X-axis, the leftward direction will be defined as the positive direction of the Y-axis, and the upward direction will be defined as the positive direction of the Z-axis.

The first traveling motion unit 3 is assembled to the base frame 2. More specifically, the base frame 2 is provided such that the base frame 2 covers the first traveling motion unit 3 except for a lower portion of the first traveling motion unit 3 grounded on the floor surface. Further, the annular core 6 of the first traveling motion unit 3 is rotatably supported about the axis thereof by the base frame 2. In this case, the base frame 2 is tiltable in the direction about the axis of the annular core 6 (in the direction about the Y-axis) of the first traveling motion unit 3, with the axis of the annular core 6 being the support point. In addition, by tilting together with the first traveling motion unit 3 with respect to the floor surface, the base frame 2 is also tiltable in the direction about the X-axis, which is orthogonal to the axis of the annular core 6, with the ground contact portion of the first traveling motion unit 3 being the support point. Hence, the base frame 2 is tiltable about the two axes with respect to the vertical direction.

Further, a first actuator unit 8, which generates the driving force for moving the first traveling motion unit 3, is installed in the base frame 2, as illustrated in FIG. 2. The first actuator unit 8 is composed of an electric motor 8a serving as the actuator that rotationally drives the annular core 6, and an electric motor 8b serving as the actuator that rotationally drives the rollers 7. The electric motors 8a and 8b impart rotational driving forces to the annular core 6 and the rollers 7, respectively, through power transmission mechanisms (not illustrated). The power transmission mechanisms may have publicly known structures.

The first traveling motion unit 3 may have a structure that is different from the structure described above. For example, as the structures of the first traveling motion unit 3 and the driving system thereof, the structures proposed by the applicant of the present application in PCT WO/2008/132778 or PCT WO/2008/132779 may be adopted.

Further, the saddle unit 5 is assembled to the base frame 2. The saddle unit 5 is comprised of a seat on which a rider sits and which is fixed to the upper end portion of the base frame 2. A rider can sit on the saddle unit 5, with the longitudinal direction thereof being set as the X-axis direction and the lateral direction being set as the Y-axis direction. Further, since the saddle unit 5 (the seat) is fixed to the base frame 2, the saddle unit 5 can be tilted integrally with the base frame 2 with respect to the vertical direction.

A pair of foot rests 9, 9 on which a rider sitting on the saddle unit 5 rests his or her feet, and a pair of handles 10, 10 to be gripped by the rider are also assembled to the base frame 2. The foot rests 9, 9 are protrusively provided on lower portions of both sides of the base frame 2. In FIG. 1 and FIG. 2, the foot rest 9 on one side (namely, the right side) is not illustrated.

The handles 10, 10, which are shaped like bars, extend in the X-axis direction (the longitudinal direction) on both sides of the saddle unit 5. Each of the handles 10, 10 is fixed to the base frame 2 through a rod 11 extended from the base frame 2. One handle 10 (namely, the handle 10 on the right side in the drawing) of the handles 10, 10 is provided with a joystick 12 serving as an operating device.

The joystick 12 can be pivotally operated in the longitudinal direction (the direction about the Y-axis) and the lateral direction (the direction about the X-axis direction). Further, the joystick 12 outputs an operation signal indicating the amount of a pivot in the longitudinal direction (the direction about the Y-axis) as a command for moving the vehicle 1 forward or backward and an operation signal indicating the amount of a pivot in the lateral direction (the direction about the X-axis) as a command (turning command) for turning the vehicle 1 in the right direction (clockwise) or in the left direction (counterclockwise).

In the present embodiment, regarding the pivot amount of the joystick 12 in the longitudinal direction (i.e., the amount of rotation in the direction about the Y-axis), for example, the forward pivot amount is defined as positive, while the backward pivot amount is defined as negative. Further, regarding the pivot amount of the joystick 12 in the lateral direction (i.e., the amount of rotation in the direction about the X-axis), for example, the leftward pivot amount is defined as positive, while the rightward pivot amount is defined as negative.

The second traveling motion unit 4 in the present embodiment is composed of a so-called omniwheel. The omniwheel acting as the second traveling motion unit 4 has a publicly known structure that includes a pair of coaxial annular cores (not illustrated) and a plurality of barrel-shaped rollers 13, which are rotatably and externally inserted in the annular cores, with the rotational axes thereof being directed in the circumferential direction of the annular cores.

In this case, the second traveling motion unit 4 is disposed behind the first traveling motion unit 3 such that the axes of the paired annular cores thereof are directed in the X-axis direction (the longitudinal direction) and is grounded on the floor surface through the rollers 13.

The rollers 13 of one of the paired annular cores and the rollers 13 of the other thereof are disposed with their phases shifted in the circumferential direction of the annular cores. Hence, when the paired annular cores rotate, the rollers 13 of one of the paired annular cores or the rollers 13 of the other thereof come in contact with the floor surface.

The second traveling motion unit 4 composed of the omniwheel is connected to the base frame 2. More specifically, the second traveling motion unit 4 has a housing 14 that covers the upper part of the omniwheel (all the pair of the annular cores and the plurality of rollers 13). The pair of annular cores of the omniwheel is journaled by the housing 14 such that the annular cores are rotatable about the axes thereof. Further, an arm 15 extended from the housing 14 toward the base frame 2 is journaled by the base frame 2 such that the arm 15 can be pivoted about the axis of the annular core 6 of the first traveling motion unit 3. Thus, the second traveling motion unit 4 is connected to the base frame 2 through the arm 15.

Further, the second traveling motion unit 4 is pivotable about the axis of the annular core 6 of the first traveling motion unit 3 with respect to the base frame 2 by the pivoting of the arm 15. This arrangement enables the saddle unit 5 to tilt together with the base frame 2 in the direction about the Y-axis, with both the first traveling motion unit 3 and the second traveling motion unit 4 remaining grounded.

The arm 15 may be journaled by the axial portion of the annular core 6 of the first traveling motion unit 3, and the second traveling motion unit 4 may be connected to the first traveling motion unit 3 through the arm 15.

Further, the base frame 2 is provided with a pair of stoppers 16, 16, which restricts the pivoting range of the arm 15. In other words, the arm 15 can pivot within the range defined by the stoppers 16, 16. Thus, the pivoting range of the second traveling motion unit 4 about the axis of the annular core 6 of the first traveling motion unit 3 and consequently the tilting range of the base frame 2 and the saddle unit 5 in the direction about the X-axis are restricted. This arrangement prevents the base frame 2 and the saddle unit 5 from excessively tilting toward the rear side of the rider.

The second traveling motion unit 4 may be urged by a spring or the like to be pushed against the floor surface.

As described above, the second traveling motion unit 4 can travel in all directions, including the X-axis direction and the Y-axis direction, on the floor surface, as with the first traveling motion unit 3 by rotating the pair of annular cores and/or rotating the rollers 13. More specifically, the second traveling motion unit 4 can travel in the Y-axis direction (the lateral direction) by the rotation of the annular cores and can travel in the X-axis direction (the longitudinal direction) by the rotation of the rollers 13.

Further, an electric motor 17 acting as a second actuator unit that drives the second traveling motion unit 4 is installed to the housing 14 of the second traveling motion unit 4. The electric motor 17 is connected to the pair of annular cores to rotationally drive the pair of annular cores of the second traveling motion unit 4.

According to the present embodiment, therefore, the second traveling motion unit 4 travels in the X-axis direction in a driven manner by following the travel of the first traveling motion unit 3 in the X-axis direction. Further, the second traveling motion unit 4 travels in the Y-axis direction by rotationally driving the pair of annular cores of the second traveling motion unit 4 by the electric motor 17.

Supplementarily, the second traveling motion unit 4 may have the same structure as the first traveling motion unit 3.

The above has described the mechanical configuration of the vehicle 1 in the present embodiment. Supplementarily, in the present embodiment, the first traveling motion unit 3, the first actuator unit 8, and the saddle unit 5 correspond to the traveling motion unit, the actuator unit, and the object mounting unit, respectively, in the present invention.

Further, although the vehicle 1 in the present embodiment is a vehicle provided with the second traveling motion unit 4, the vehicle 1 may alternatively be a vehicle not provided with the second traveling motion unit 4. In this case, the second actuator unit (the electric motor 17) and a second control processing unit 22, which will be discussed later, are unnecessary.

Figure 3:
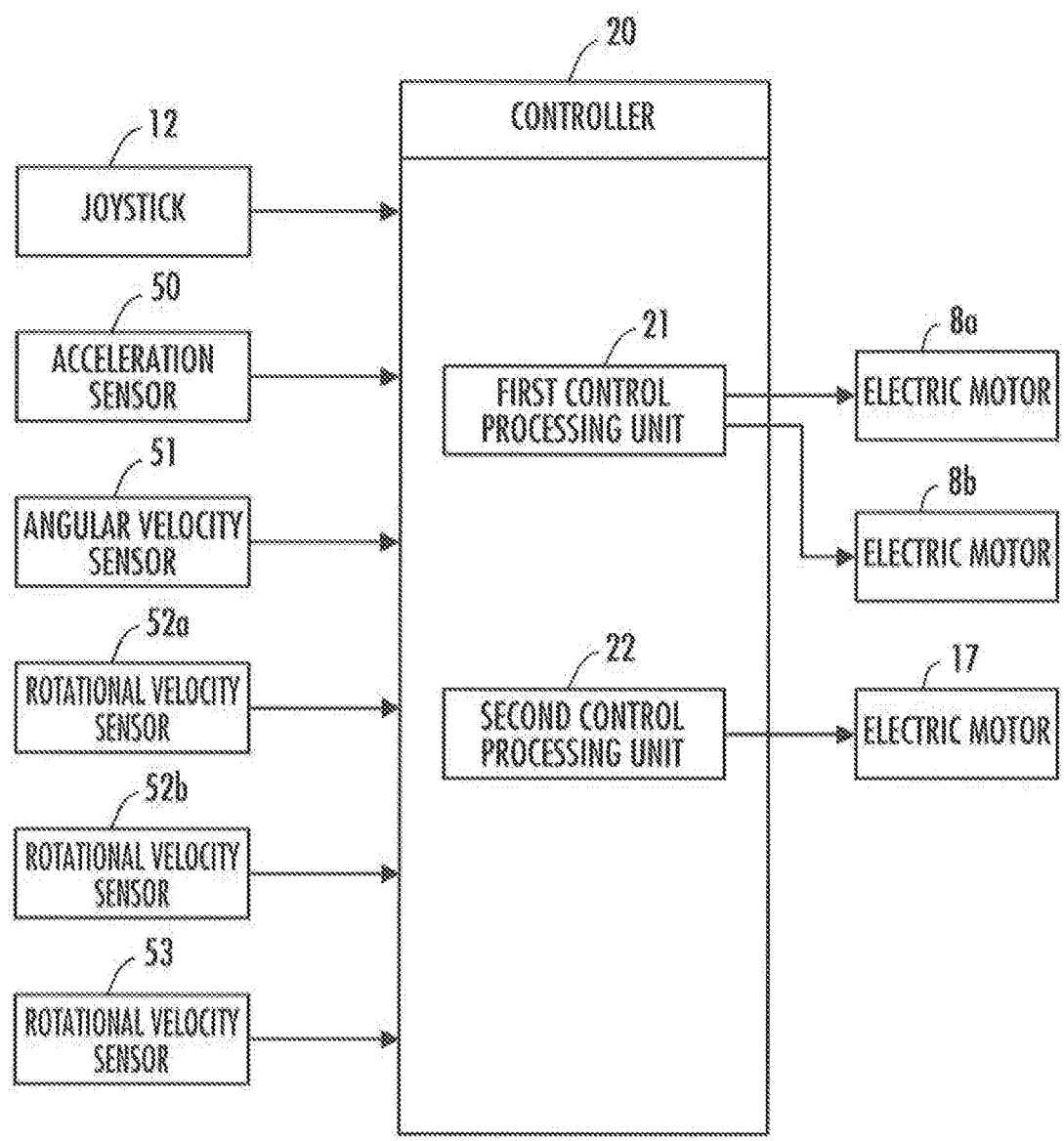
FIG. 3 is a block diagram illustrating a configuration related to the control of the inverted pendulum type vehicle according to the embodiment.

Although not illustrated in FIG. 1 and FIG. 2, the base frame 2 of the vehicle 1 according to the present embodiment includes, as the units and parts for controlling the operation of the vehicle 1 (for controlling the operations of the first traveling motion unit 3 and the second traveling motion unit 4), a controller 20 composed of an electronic circuit unit that includes a CPU, a RAM, a ROM and the like, an acceleration sensor 50 which detects the accelerations of the base frame 2 in the directions of the three axes, an angular velocity sensor 51 which detects the angular velocities about the three axes, a rotational velocity sensor 52a which detects the rotational velocity of the electric motor 8a, a rotational velocity sensor 52b which detects the rotational velocity of the electric motor 8b, and a rotational velocity sensor 53 which detects the rotational velocity of the electric motor 17, as illustrated in FIG. 3.

The angular velocity sensor 51 is composed of, for example, a gyro sensor or the like. The rotational velocity sensors 52a, 52b, and 53 are composed of, for example, rotary encoders, resolvers or the like. The acceleration sensor 50 and the angular velocity sensor 51 correspond to the inertial sensors in the present invention.

Further, the controller 20 receives outputs (operation signals) of the joystick 12 and the detection signals of the acceleration sensor 50, the angular velocity sensor 51, and the rotational velocity sensors 52a, 52b and 53.

The controller 20 has a function for acquiring, from the detection signals of the acceleration sensor 50 and the angular velocity sensor 51, the measurement values of the translational accelerations (the translational accelerations in the X-axis direction and the Y-axis direction) of the base frame 2, the measurement value of the angular velocity (the angular velocity in a yaw direction (the direction about the Z-axis)) of the base frame 2, and the measurement value of the tilt angle of the saddle unit 5 of the base frame 2 (=the tilt angle of the base frame 2) by using a publicly known technique, such as the strap-down method.

The tilt angle of the saddle unit 5 (or the tilt angle of the base frame 2) in the present embodiment is more specifically the tilt angle (a set of the tilt angle in the direction about the X-axis and the tilt angle in the direction about the Y-axis) when the attitude of the saddle unit 5 (or the base frame 2) in a state, in which the overall center of gravity of the vehicle 1 (the overall center of gravity, including a rider when the rider is on the saddle unit 5) is positioned directly above or substantially directly above (above in the vertical direction) the grounded portion of the first traveling motion unit 3, is defined as the reference (zero).

The controller 20 is provided with a first control processing unit 21, which controls the traveling motion of the first traveling motion unit 3 by controlling the electric motors 8a, 8b constituting the first actuator unit 8, and a second control processing unit 22, which controls the traveling motion of the second traveling motion unit 4 by controlling the electric motor 17 acting as the second actuator unit, in addition to the function for acquiring the measurement values as described above, as the functions implemented by installed hardware or programs.

The first control processing unit 21 sequentially calculates a desired velocity, which is the desired value of the travel velocity (more specifically, the set of the translational velocity in the X-axis direction and the translational velocity in the Y-axis direction) of the first traveling motion unit 3 by carrying out the arithmetic processing, which will be discussed later. Further, the first control processing unit 21 controls the rotational velocities of the electric motors 8a, 8b such that the actual travel velocity of the first traveling motion unit 3 coincides with the desired velocity.

In this case, the relationship between the rotational velocity of each of the electric motors 8a, 8b and the actual travel velocity of the first traveling motion unit 3 (more specifically, the travel velocity when there is no slip between the first traveling motion unit 3 and the floor surface) is determined in advance according to the configuration of a power transmission mechanism interposed between the electric motors 8a, 8b and the first traveling motion unit 3. Thus, the desired values of the rotational velocities of the electric motors 8a, 8b are specified on the basis of the desired velocity of the first traveling motion unit 3.

The first control processing unit 21 feedback-controls the rotational velocities of the electric motors 8a, 8b to the desired values specified on the basis of the desired velocity of the first traveling motion unit 3, thereby controlling the actual travel velocity of the first traveling motion unit 3 to the desired velocity.

Further, the second control processing unit 22 carries out the arithmetic processing, which will be discussed later, to sequentially calculate the desired velocity of the travel velocity (more specifically, the translational velocity in the Y-axis direction) of the second traveling motion unit 4. Then, the second control processing unit 22 controls the rotational velocity of the electric motor 17 such that the actual travel velocity of the second traveling motion unit 4 in the Y-axis direction coincides with the desired velocity.

In this case, as with the case of the first traveling motion unit 3, the relationship between the rotational velocity of the electric motor 17 and the actual travel velocity of the second traveling motion unit 4 in the Y-axis direction (more specifically, the travel velocity when there is no slip between the second traveling motion unit 4 and the floor surface) is determined in advance. Thus, the desired value of the rotational velocity of the electric motor 17 is specified on the basis of the desired velocity of the second traveling motion unit 4.

Then, the first control processing unit 21 feedback-controls the rotational velocity of the electric motor 17 to the desired value specified on the basis of the desired velocity of the second traveling motion unit 4, thereby controlling the actual travel velocity of the second traveling motion unit 4 in the Y-axis direction to the desired velocity.

Supplementarily, according to the present embodiment, therefore, the second traveling motion unit 4 travels in the X-axis direction in a driven manner by following the travel of the first traveling motion unit 3 in the X-axis direction. Hence, there is no need to set the desired value of the travel velocity of the second traveling motion unit 4 in the X-axis direction.

In the description of the embodiment in the present specification, the travel velocity of the first traveling motion unit 3 means the travel velocity of a ground contact point of the first traveling motion unit 3 unless otherwise specified. Similarly, the travel velocity of the second traveling motion unit 4 means the travel velocity of a ground contact point of the second traveling motion unit 4 unless otherwise specified. The travel velocity of the ground contact point of the first traveling motion unit 3 means, in other words, the translational travel velocity of a representative point of the first traveling motion unit 3. The same applies to the travel velocity of a ground contact point of the second traveling motion unit 4.

The processing carried out by the first control processing unit 21 and the second control processing unit 22 will be described in further detail. Referring first to FIG. 4 to FIG. 12B, the processing carried out by the first control processing unit 21 will be described.

Figure 4:
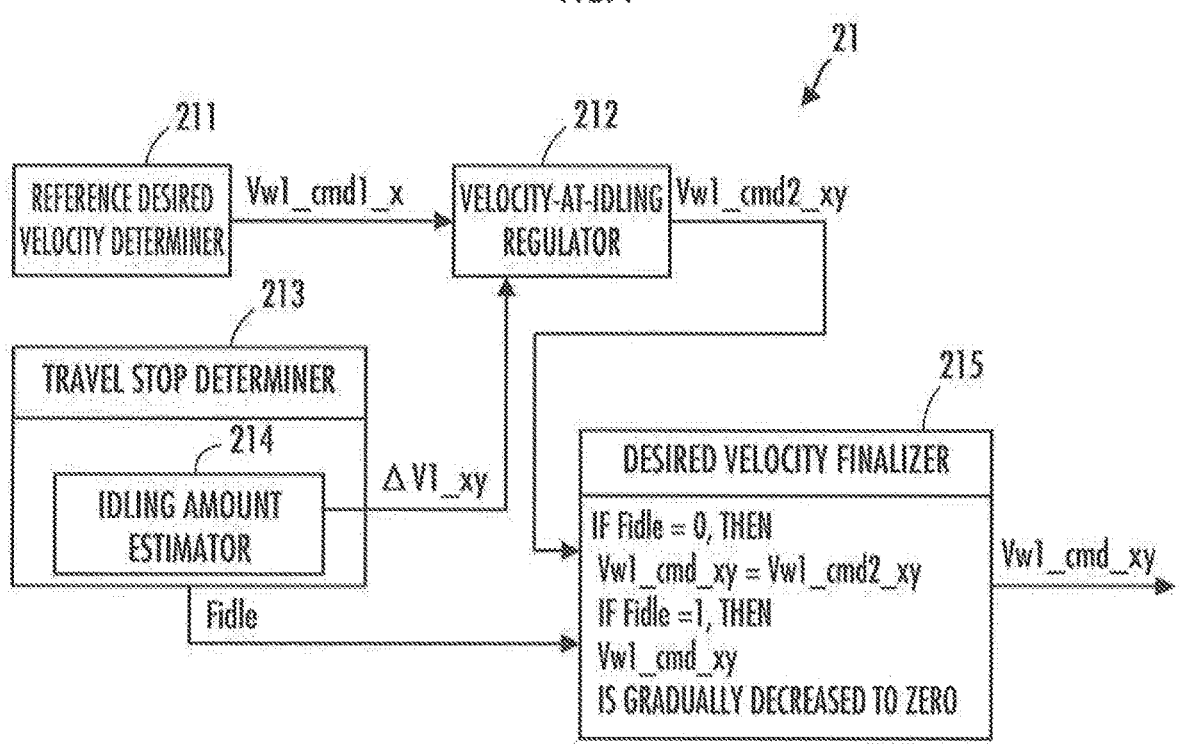
FIG. 4 is a block diagram illustrating the outline of the processing carried out by a first control processing unit illustrated in FIG. 3.

As illustrated in FIG. 4, the first control processing unit 21 includes a reference desired velocity determiner 211 which sequentially calculates a reference desired velocity Vw1_cmd1_xy, which denotes the desired value of the reference of the travel velocity of the first traveling motion unit 3, by the arithmetic processing to be discussed later, a velocity-at-idling regulator 212 which corrects the reference desired velocity Vw1_cmd1_xy, as appropriate, in the case where the idling of the first traveling motion unit 3 has occurred, a travel stop determiner 213 which determines whether to stop the travel motion of the first traveling motion unit 3 according to the degree of the idling of the first traveling motion unit 3, and a desired velocity finalizer 215 which finalizes the desired velocity Vw1_cmd_xy (denoting the desired value of the travel velocity) of the first traveling motion unit 3 according to the outputs of the velocity-at-idling regulator 212 and the travel stop determiner 213.

In this case, the travel stop determiner 213 includes a function as an idling amount estimator 214 which estimates an idling amount ΔV1_xy of the first traveling motion unit 3. The estimated value of the idling amount ΔV1_xy is used by the velocity-at-idling regulator 212.

The suffix "_xy" of a reference character, such as Vw1_cmd1_xy, means the set of a component in the X-axis direction and a component in the Y-axis direction. Furthermore, the reference desired velocity determiner 211 corresponds to the reference desired motion determiner of the present invention.

The first control processing unit 21 sequentially carries out the processing by the foregoing functional units at a predetermined arithmetic processing cycle thereby to sequentially determine the desired velocity Vw1_cmd_xy of the first traveling motion unit 3. In this case, the first control processing unit 21 carries out the processing by the reference desired velocity determiner 211 and the travel stop determiner 213 at each arithmetic processing cycle. The first control processing unit 21 further carries out the processing by the velocity-at-idling regulator 212 and then carries out the processing by the desired velocity finalizer 215, thereby determining the desired velocity Vw1_cmd_xy of the first traveling motion unit 3.

Figure 5:
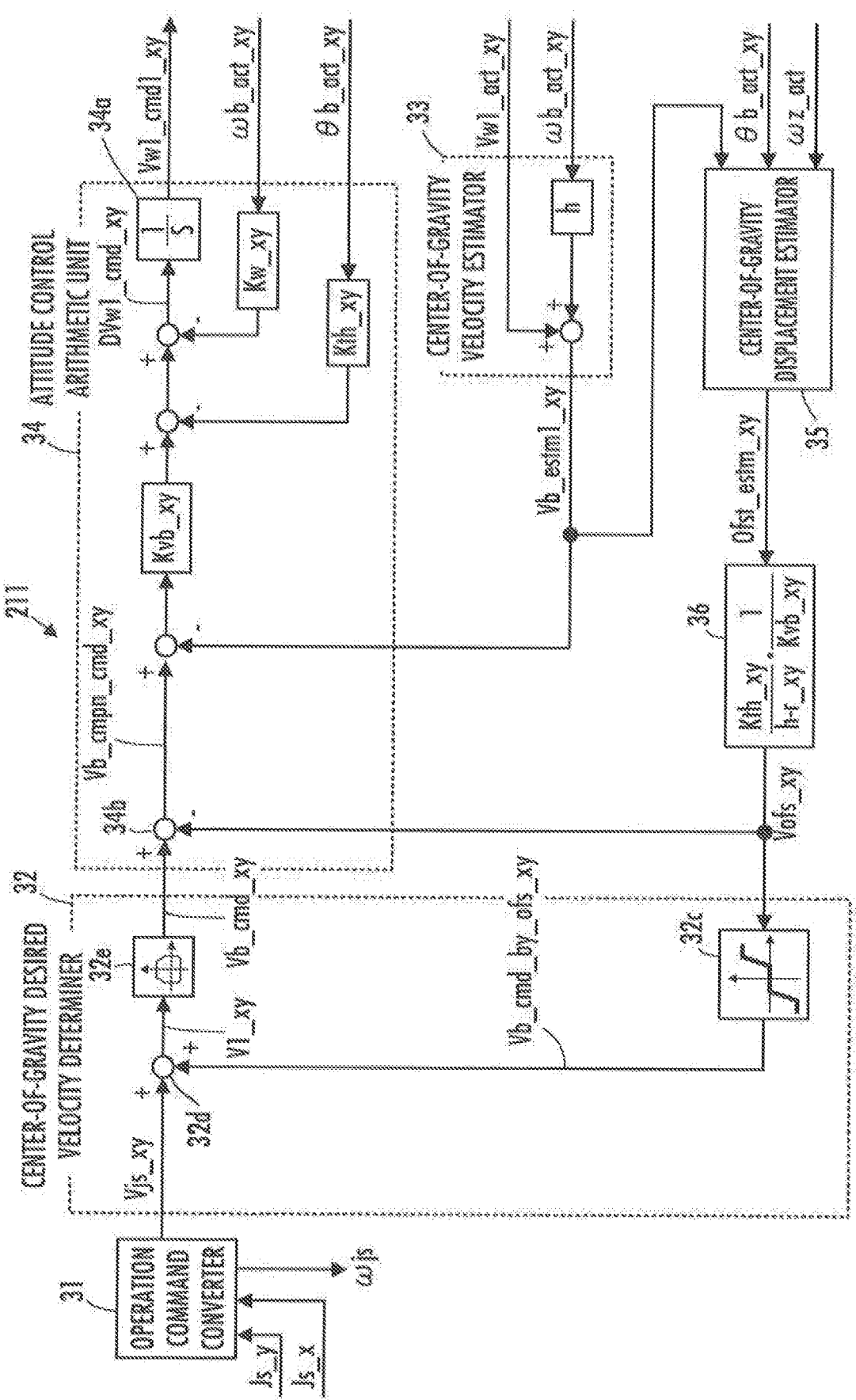
FIG. 5 is a block diagram illustrating the processing carried out by a reference desired velocity determiner illustrated in FIG. 4.

As illustrated in FIG. 5, the reference desired velocity determiner 211 includes, as the major functional parts thereof, an operation command converter 31 which performs conversion into a velocity command for the travel of the vehicle 1 on the basis of a pivot amount of the joystick 12 in the longitudinal direction (the amount of rotation in the direction about the Y-axis) Js_x and the pivot amount of the joystick 12 in the lateral direction (the amount of rotation in the direction about the X-axis) Js_y indicated by the operation signals input from the joystick 12, a center-of-gravity desired velocity determiner 32 which determines the desired velocity of the overall center of gravity of the vehicle 1 (hereinafter referred to as "the vehicle system overall center of gravity"), a center-of-gravity velocity estimator 33 which estimates the velocity of the vehicle system overall center of gravity, an attitude control arithmetic unit 34 which determines the desired velocity of the first traveling motion unit 3 to stabilize the attitude of the saddle unit 5 (the attitude of the base frame 2) while making the estimated velocity of the vehicle system overall center of gravity follow the desired velocity, a center-of-gravity displacement estimator 35 which estimates the amount of displacement of the center of gravity (which will be discussed later) of the vehicle system overall center of gravity, and a center-of-gravity displacement influence amount calculator 36 which calculates the amount of influence of the center-of-gravity displacement which is attributable to the center-of-gravity displacement amount and which will be discussed later.

Further, the reference desired velocity determiner 211 determines a reference desired velocity Vw1_cmd1_xy by carrying out the processing through the foregoing functional parts at each arithmetic processing cycle.

Figure 6:
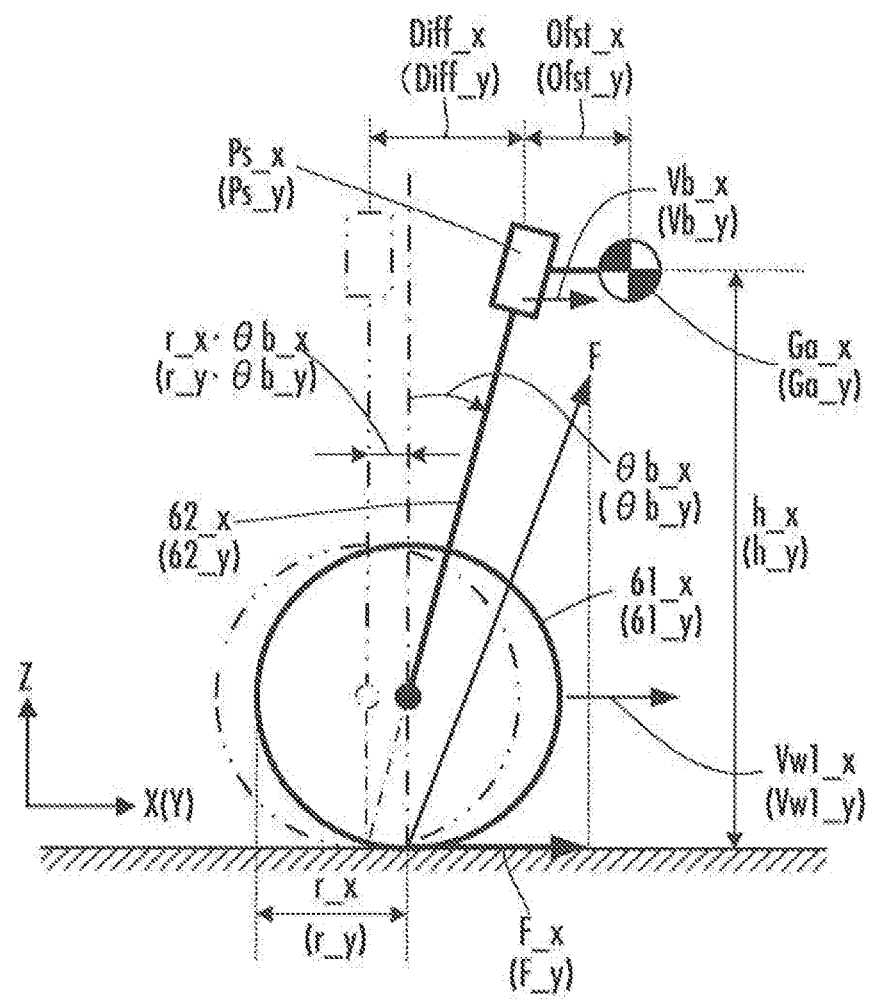
FIG. 6 is a diagram illustrating an inverted pendulum model used in the processing carried out by the reference desired velocity determiner illustrated in FIG. 4.

Before describing in specific detail the processing by each functional part of the reference desired velocity determiner 211, the basic matters of the processing will be described. The dynamic behaviors (more specifically, the behaviors observed from the Y-axis direction and the behaviors observed from the X-axis direction) of the vehicle system overall center of gravity is approximately represented by an inverted pendulum model as illustrated in FIG. 6. The algorithm of the processing by the first control processing unit 21, such as the reference desired velocity determiner 211, is created on the basis of the foregoing behaviors.

In the description of the embodiments in the present specification, including the reference characters in FIG. 6, the suffix "_x" means the reference character of, for example, a variable when the vehicle 1 is observed from the Y-axis direction, and the suffix "_y" means the reference character of, for example, a variable when the vehicle 1 is observed from the X-axis direction. Further, in FIG. 6, the reference characters of the variables when the inverted pendulum model is observed from the Y-axis direction are not parenthesized, and the reference characters of the variables when the inverted pendulum model is observed from the X-axis direction are parenthesized in order to illustrate both the inverted pendulum model observed from the Y-axis direction and the inverted pendulum model observed from the X-axis direction.

The inverted pendulum model representing the behavior of the vehicle system overall center of gravity observed from the Y-axis direction has a virtual wheel 61_x which has a rotational axis parallel to the Y-axis direction and which is rollable on a floor surface (hereinafter referred to as "the virtual wheel 61_x"), a rod 62_x which is extended from the center of rotation of the virtual wheel 61_x and which is pivotable about the axis of rotation of the virtual wheel 61_x (in the direction about the Y-axis), and a mass point Ga_x connected to a reference portion Ps_x, which is the distal end portion (the upper end portion) of the rod 62_x.

In the inverted pendulum model, the motion of the mass point Ga_x corresponds to the motion of the vehicle system overall center of gravity observed from the Y-axis direction. Further, a tilt angle θb_x (the tilt angle in the direction about the Y-axis) of the rod 62_x with respect to the vertical direction coincides with the tilt angle in the direction about the Y-axis of the saddle unit 5 (or the base frame 2). Further, the translational motion in the X-axis direction of the first traveling motion unit 3 corresponds to the translational motion in the X-axis direction by the rolling of the virtual wheel 61_x.

Further, a radius r_x of the virtual wheel 61_x and heights h_x of the reference portion Ps_x and the mass point Ga_x from a floor surface are defaults (fixed values) set in advance.

Similarly, the inverted pendulum model representing the behavior of the vehicle system overall center of gravity observed from the X-axis direction has a virtual wheel 61_y which has a rotational axis parallel to the X-axis direction and which is rollable on a floor surface (hereinafter referred to as "the virtual wheel 61_y"), a rod 62_y which is extended from the center of rotation of the virtual wheel 61_y and which is pivotable about the rotational axis of the virtual wheel 61_y (the direction about the X-axis), and a mass point Ga_v connected to a reference portion Ps_y, which is the distal end (the upper end) of the rod 62y.

In the inverted pendulum model, the motion of the mass point Ga_y corresponds to the motion of the vehicle system overall center of gravity observed from the X-axis direction. Further, a tilt angle θb_y (the tilt angle in the direction about the X-axis) of the rod 62_y with respect to the vertical direction coincides with the tilt angle in the direction about the X-axis of the saddle unit 5 (or the base frame 2). Further, the translational motion in the Y-axis direction of the first traveling motion unit 3 corresponds to the translational motion in the Y-axis direction by the rolling of the virtual wheel 61_y.

Further, a radius r_y of the virtual wheel 61_y and heights h_y of the reference portion Ps_y and the mass point Ga_y from a floor surface are defaults (fixed values) set in advance. The heights h_y of the reference portion Ps_y and the mass point Ga_y from the floor surface observed in the X-axis direction are identical to the heights h_x of the reference portion Ps_x and the mass point Ga_x from a floor surface observed in the Y-axis direction. Hereinafter, therefore, h_x=h_y=h will apply.

A supplemental description will be given of the positional relationship between the reference portion Ps_x and the mass point Ga_x when observed from the Y-axis direction. The position of the reference portion Ps_x corresponds to the position of the vehicle system overall center of gravity in the case where it is assumed that the rider mounted (seated) on the saddle unit 5 remains still in a neutral posture determined in advance with respect to the saddle unit 5.

In this case, therefore, the position of the mass point Ga_x coincides with the position of the reference portion Ps_x. The same applies to the positional relationship between the reference portion Ps_y and the mass point Ga_y when observed from the X-axis direction.

In actuality, however, the actual position in the X-axis direction and the actual position in the Y-axis direction of the vehicle system overall center of gravity are usually displaced in a horizontal direction from the positions of the reference portions Ps_x and Ps_y when the rider on the saddle unit 5 moves his or her upper body or the like with respect to the saddle unit 5 (or the base frame 2). For this reason, FIG. 6 illustrates a state in which the positions of the mass points Ga_x and Ga_y have been displaced from the positions of the reference portions Ps_x and Ps_y, respectively.

The behavior of the vehicle system overall center of gravity represented by the inverted pendulum model described above is represented by expressions (1a), (1b), (2a) and (2b) given below. In this case, expressions (1a) and (1b) represent the behavior observed in the Y-axis direction, and expressions (2a) and (2b) represent the behavior observed in the X-axis direction.

$$Vb\_x = Vw1\_x + h \cdot \omega b\_x \tag{1a}$$

$$dVb\_x/dt = (g/h) \cdot (\theta b\_x \cdot (h - r\_x) + Ofst\_x) + \omega z \cdot Vb\_y \tag{1b}$$

$$Vb\_y = Vw1\_y + h \cdot \omega b\_y \tag{2a}$$

$$dVb\_y/dt = (g/h) \cdot (\theta b\_y \cdot (h - r\_y) + Ofst\_y) - \omega z \cdot Vb\_x \tag{2b}$$

In the expressions, Vb_x denotes the velocity (the translational velocity) of the vehicle system overall center of gravity in the X-axis direction, θb_x denotes the tilt angle of the saddle unit 5 (or the base frame 2) in the direction about the Y-axis, Vw1_x denotes the travel velocity (the translational velocity) of the virtual wheel 61_x in the X-axis direction, ωb_x denotes a temporal change rate of θb_x (=dθb_x/dt), Ofst_x denotes the amount of displacement in the X-axis direction of the position of the vehicle system overall center of gravity in the X-axis direction (the position of the mass point Ga_x in the X-axis direction) from the position of the reference portion Ps_x, Vb_y denotes the velocity (the translational velocity) of the vehicle system overall center of gravity, Vw1_y denotes the travel velocity (the translational velocity) of the virtual wheel 61_y in the Y-axis direction (the translational velocity), θb_y denotes the tilt angle of the saddle unit 5 (or the base frame 2) in the direction about the X-axis, and ωb_y denotes a temporal change rate of θb_y (=dθb_y/dt), Ofst_y denotes the amount of displacement of the position of the vehicle system overall center of gravity in the Y-axis direction (the position of the mass point Ga_y in the Y-axis direction) from the position of the reference portion Ps_y. Further, ωz denotes a yaw rate (the angular velocity in the direction about a yaw axis) when the vehicle 1 turns, and g denotes a gravitational acceleration constant.

In expressions (1a), (1b), (2a) and (2b), the positive directions of θb_x and ωb_x are the directions in which the vehicle system overall center of gravity tilts in the positive direction of the X-axis (forward), and the positive directions of θb_y and ωb_y are the directions in which the vehicle system overall center of gravity tilts in the positive direction of the Y-axis (leftward). Further, the positive direction of ωz is the counterclockwise direction when the vehicle 1 is observed from above.

The second term of the right side (=h·ωb_x) of expression (1a) denotes the translational velocity component of the reference portion Ps_x in the X-axis direction generated by the tilt of the saddle unit 5 in the direction about the Y-axis. The second term of the right side (=h·ωb_) of expression (2a) denotes the translational velocity component of the reference portion Ps_y in the Y-axis direction generated by the tilt of the saddle unit 5 in the direction about the X-axis.

Supplementarily, Vw1_x in expression (1a) is, more specifically, the relative circumferential velocity of the virtual wheel 61_x with respect to the rod 62_x (in other words, with respect to the saddle unit 5 or the base frame 2). Hence, Vw1_x includes a velocity component associated with the tilt of the rod 62_x (=r_x·ωb_x) in addition to the moving velocity of the ground contact point of the virtual wheel 61_x in the X-axis direction with respect to the floor surface (the moving velocity of the ground contact point of the first traveling motion unit 3 in the X-axis direction with respect to the floor surface). The same applies to Vw1_y in expression (1b).

Further, the first term of the right side of expression (1b) denotes the acceleration component in the X-axis direction which is generated in the vehicle system overall center of gravity by the X-axis direction component (namely, F_x in FIG. 6) of a floor reaction force (denoted by F in FIG. 6) acting on the ground contact portion of the virtual wheel 61_x according to the amount of displacement (=θb_x·(h−r_x)+Ofst_x) of the position of the vehicle system overall center of gravity in the X-axis direction (the position of the mass point in the X-axis direction Ga_x) from the vertical upper position of the ground contact portion of the virtual wheel 61_x (the ground contact portion of the first traveling motion unit 3 observed from the Y-axis direction). The second term of the right side of expression (1b) denotes the acceleration component in the X-axis direction generated by the centrifugal force acting on the vehicle 1 when turning at the yaw rate of (Z.

Similarly, the first term of the right side of expression (2b) denotes the acceleration component in the Y-axis direction which is generated in the vehicle system overall center of gravity by the Y-axis direction component (namely, F_y in FIG. 6) of a floor reaction force (denoted by F in FIG. 6) acting on the ground contact portion of the virtual wheel 61_y according to the displacement amount (=θb_y·(h−r_y)+Ofst_y) of the position of the vehicle system overall center of gravity in the Y-axis direction (the position of the mass point in the Y-axis direction Ga_y) from the vertical upper position of the ground contact portion of the virtual wheel 61_y (the ground contact portion of the first traveling motion unit 3 observed from the X-axis direction). The second term of the right side of expression (2b) denotes the acceleration component in the Y-axis direction generated by the centrifugal force acting on the vehicle 1 when turning at the yaw rate of ωz.

Figure 7:
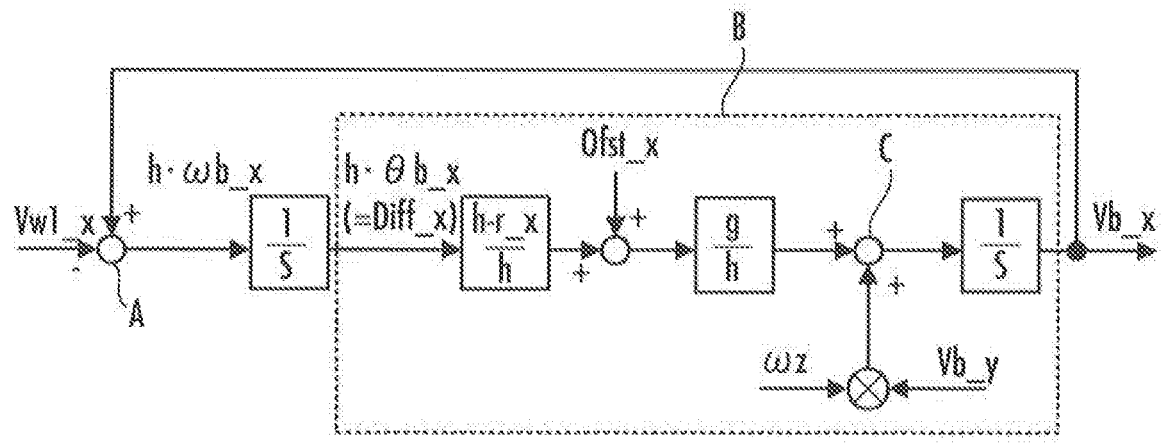
FIG. 7 is a block diagram illustrating a behavior associated with the inverted pendulum model in FIG. 6.

As described above, the behaviors (the behaviors observed in the Y-axis direction) represented by expressions (1a) and (1b) are represented by a block diagram of FIG. 7. In the diagram, 1/s denotes integrating operation.

The processing by the arithmetic unit marked with a reference character A in FIG. 7 corresponds to the relational expression of expression (1a). Further, the processing by the arithmetic unit marked with a reference character B corresponds to the relational expression of expression (1b). In FIG. 7, h·θb_x approximately coincides with Diff_x illustrated in FIG. 6.

Meanwhile, a block diagram representing the behavior (the behavior observed in the X-axis direction) represented by expressions (2a) and (2b) is obtained by interchanging the suffixes "_x" and "_y" in FIG. 7, and by replacing the sign "+" of the acceleration component (the acceleration component generated by a centrifugal force), which is one of the inputs to the adder marked by a reference character C and which is on the lower side in the diagram, with "−."

In the present embodiment, the algorithm of the processing by the first control processing unit 21 is created on the basis of the behavior model (the inverted pendulum model) of the vehicle system overall center of gravity, which takes into account the displacement amount of the vehicle system overall center of gravity from the reference portions Ps_x and Ps_y and the centrifugal force as described above.

Based on the above, the processing by the reference desired velocity determiner 211 of the first control processing unit 21 will be described in more detail. In the following description, a set of the value of a variable associated with the behavior observed from the Y-axis direction and the value of a variable associated with the behavior observed from the X-axis direction will be denoted by adding a suffix "_xy."

Referring to FIG. 5, the reference desired velocity determiner 211 first carries out, in each arithmetic processing cycle, the processing by the operation command converter 31 and the processing by the center-of-gravity velocity estimator 33.

Figure 8:
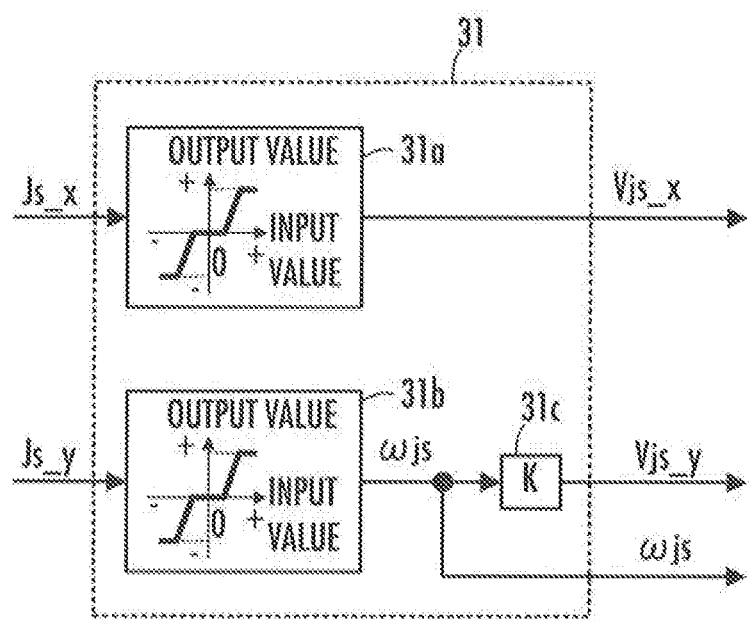
FIG. 8 is a block diagram illustrating the processing carried out by an operation command converter illustrated in FIG. 5.

The operation command converter 31 determines a basic velocity command Vjs_xy, which is the basic command value of the travel velocity (the translational velocity) of the first traveling motion unit 3, and a turning angular velocity command ωjs, which is a command value of the angular velocity in the direction about the yaw axis when the vehicle 1 turns, according to the amount of pivot of the joystick 12 in the Y-axis direction (the amount of rotation about the X-axis) Js_y and the amount of pivot of the joystick 12 in the X-axis direction (the amount of rotation about the Y-axis) Js_x, as illustrated in FIG. 8.

In the basic velocity command Vjs_xy, the X-axis direction basic velocity command Vjs_x is determined by a processing section 31a according to the amount of pivot in the X-axis direction Js_x of the joystick 12. More specifically, if the pivot amount Js_x is the amount of pivot in the positive direction (a forward pivot amount), then the X-axis direction basic velocity command Vjs_x will be a command of velocity in the advancing direction of the vehicle 1 (a positive velocity command). Further, if the pivot amount Js_x is the amount of pivot in the negative direction (a backward pivot amount), then the X-axis direction basic velocity command Vjs_x will be a command of velocity in the backward direction of the vehicle 1 (a negative velocity command). In this case, the magnitude of the X-axis direction basic velocity command Vjs_x is determined such that the X-axis direction basic velocity command Vjs_x increases within a range of a predetermined upper limit or less as the magnitude of the amount of pivot in the X-axis direction Js_x (the forward or the backward direction) of the joystick 12 increases.

A predetermined range in which the magnitude of the amount of pivot Js_x in the positive direction or the negative direction of the joystick 12 is sufficiently small may be defined as a dead zone, and the X-axis direction basic velocity command Vjs_x may be set to zero for a pivot amount within the dead zone. The graph given in the processing section 31a of FIG. 8 illustrates the relationship between the input (Js_x) and the output (Vjs_x) in the case where there is the dead zone.

Further, in the basic velocity command Vjs_xy, the Y-axis direction basic velocity command Vjs_y is determined according to the amount of pivot in the Y-axis direction Js_y of the joystick 12 as the Y-axis direction velocity command of the first traveling motion unit 3 for the turning of the vehicle 1. More specifically, if the pivot amount Js_y is the amount of pivot in the negative direction (a rightward pivot amount), then the Y-axis direction basic velocity command Vjs_y will be a leftward velocity command (a positive velocity command) for the vehicle 1. Further, if the pivot amount Js_y is the amount of pivot in the positive direction (a leftward pivot amount), then the Y-axis direction basic velocity command Vjs_y will be a rightward velocity command (a negative velocity command) for the vehicle 1. In this case, the magnitude of the Y-axis direction basic velocity command Vjs_y is determined such that the Y-axis direction basic velocity command Vjs_y increases within a range of a predetermined upper limit or less as the magnitude of the amount of pivot of the joystick 12 in the Y-axis direction (the rightward or the leftward direction) increases.

More specifically, as illustrated in, for example, FIG. 8, the processing carried out by a processing section 31b determines the turning angular velocity command ωjs, which is the command value of the angular velocity in the direction about the yaw axis when the vehicle 1 turns, according to the amount of pivot Js_y of the joystick 12 in the Y-axis direction. To be specific, if the pivot amount Js_y of the joystick 12 is the amount of pivot in the negative direction (a rightward pivot amount), then the turning angular velocity command ωjs will be the angular velocity command of a rightward (clockwise) turn (a negative angular velocity command). Further, if the pivot amount Js_y is the amount of pivot in the positive direction (a leftward pivot amount), then the turning angular velocity command ωjs will be the angular velocity command of a leftward (counterclockwise) turn (a positive angular velocity command). In this case, the magnitude of the turning angular velocity command ωjs is determined such that the turning angular velocity command ωjs increases within a range of a predetermined upper limit or less as the magnitude of the amount of pivot of the joystick 12 in the Y-axis direction increases.

Further, in a processing section 31c, the Y-axis direction basic velocity command Vjs_y of the first traveling motion unit 3 is determined by multiplying the turning angular velocity command ωjs by a predetermined value K, which is specified in advance as the distance in the X-axis direction between the instantaneous turning center of the vehicle 1 (the instantaneous rotational center in the direction about the yaw axis in each arithmetic processing cycle when the vehicle 1 turns) and the ground contact point of the first traveling motion unit 3.

Accordingly, the Y-axis direction basic velocity command Vjs_y of the first traveling motion unit 3 is determined such that the Y-axis direction basic velocity command Vjs_y is proportional to the turning angular velocity command ωjs determined on the basis of the amount of pivot in the Y-axis direction Js_y of the joystick 12.

However, regarding the magnitude of the basic velocity command Vjs_y or the turning angular velocity command ωjs, a predetermined range in which the magnitude of the amount of pivot in the Y-axis direction of the joystick 12 is sufficiently small may be defined as a dead zone, and the Y-axis direction basic velocity command Vjs_y or the turning angular velocity command ωjs may be set to zero for a pivot amount within the dead zone. The graph given in the processing section 31b of FIG. 8 illustrates the relationship between the input (Js_y) and the output (ωjs) in the case where there is the dead zone.

Further, if the joystick 12 is operated in both the X-axis direction (the longitudinal direction) and the Y-axis direction (the lateral direction), then the magnitude of the Y-axis direction basic velocity command Vjs_y may be changed according to the amount of pivot in the X-axis direction of the joystick 12 or the X-axis direction basic velocity command Vjs_x.

The center-of-gravity velocity estimator 33 calculates an estimated value of the velocity of the vehicle system overall center of gravity Vb_estm1_xy according to a geometric (kinematic) relational expression indicated by the foregoing expressions (1a) and (2a) related to the inverted pendulum model.

To be specific, as illustrated by the block diagram of FIG. 5, the estimated value of the velocity of the vehicle system overall center of gravity Vb_estm1_xy is calculated by adding the value of an actual translational velocity Vw1_act_xy of the first traveling motion unit 3 and a value obtained by multiplying an actual temporal change rate (a tilt angular velocity) ωb_act_xy of the tilt angle θb_xy of the saddle unit 5 by the height h of the vehicle system overall center of gravity.

In other words, the estimated value of the velocity in the X-axis direction Vb_estm1_x and the estimated value of the velocity in the Y-axis direction Vb_estm1_y of the vehicle system overall center of gravity are calculated according to expressions (3a) and (3b), respectively, given below.

$$Vb\_estm1\_x = Vw1\_act\_x + h \cdot \omega b\_act\_x \qquad (3a)$$

$$Vb\_estm1\_y = Vw1\_act\_y + h \cdot \omega b\_act\_y \qquad (3b)$$

Here, however, the temporal change rate of the displacement amount Ofst_xy of the position of the vehicle system overall center of gravity from the position of the reference portion Ps_xy (hereinafter referred to as "the center-of-gravity displacement amount Ofst_xy) has been set to be sufficiently small so as to be ignorable, as compared with Vb_estm1_xy.

In this case, according to the present embodiment, the desired velocities Vw1_cmd_x and Vw1_cmd_y (previous values) of the first traveling motion unit 3 determined by the desired velocity finalizer 215 at a preceding arithmetic processing cycle are used as the values of Vw1_act_x and Vw1_act_y in the above calculation.

However, as an alternative, for example, the latest values of Vw1_act_x and Vw1_act_y obtained by detecting the rotational velocities of the electric motors 8a and 8b through the rotational velocity sensors 52a and 52b and then performing estimation based on the detection values (in other words, the latest values of the measurement values of Vw1_act_x and Vw1_act_y) may be used for the calculation of expressions (3a) and (3b).

Further, according to the present embodiment, the latest value of the temporal change rate of the measurement value of the tilt angle θb of the saddle unit 5 based on the detection signals of the acceleration sensor 50 and the angular velocity sensor 51 (in other words, the latest values of the measurement values of ωb_act_x and ωb_act_y) are used as the values of ωb_act_x and ωb_act_y.

The reference desired velocity determiner 211 carries out the processing by the operation command converter 31 and the center-of-gravity velocity estimator 33, as described above, and then carries out the processing by the center-of-gravity displacement estimator 35 illustrated in FIG. 5, thereby determining a center-of-gravity displacement amount estimated value Ofst_estm_xy, which is the estimated value of the center-of-gravity displacement amount Ofst_xy.

Figure 9:
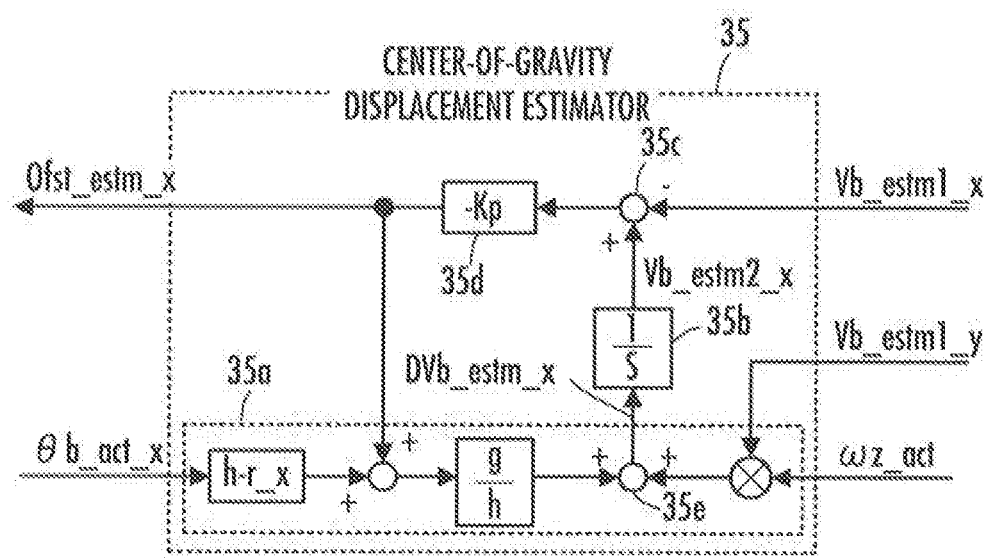
FIG. 9 is a block diagram illustrating the processing carried out by a center of gravity displacement estimator illustrated in FIG. 5.

The processing by the center-of-gravity displacement estimator 35 is the processing illustrated by the block diagram of FIG. 9. FIG. 9 representatively illustrates the processing for determining an X-axis direction center-of-gravity displacement amount estimated value Ofst_estm_x of the center-of-gravity displacement amount estimated value Ofst_estm_xy.

The processing illustrated in FIG. 9 will be described in detail. The center-of-gravity displacement estimator 35 calculates the estimated value of a translational acceleration in the X-axis direction DVb_estm_x of the vehicle system overall center of gravity by carrying out the arithmetic processing of the right side of the foregoing expression (1b) by an arithmetic unit 35a by using the measurement value (the latest value) of the actual tilt angle θb_act_x in the direction about the Y-axis of the saddle unit 5 and the measurement value (the latest value) of the actual yaw rate ωz_act of the vehicle 1, which are obtained from the detection signals of the acceleration sensor 50 and the angular velocity sensor 51, a first estimated value of the velocity in the Y-axis direction Vb_estm1_y (the latest value) of the vehicle system overall center of gravity calculated by the center-of-gravity velocity estimator 33, and the X-axis direction center-of-gravity displacement amount estimated value Ofst_estm_x (the previous value) determined in a previous arithmetic processing cycle.

The center-of-gravity displacement estimator 35 further carries out, by an arithmetic section 35b, the processing for integrating the estimated value of the translational acceleration in the X-axis direction DVb_estm_x of the vehicle system overall center of gravity, thereby calculating a second estimated value of the velocity in the X-axis direction Vb_estim2_x of the vehicle system overall center of gravity.

Subsequently, the center-of-gravity displacement estimator 35 carries out, by an arithmetic section 35c, the processing for calculating the difference between the second estimated value of the velocity in the X-axis direction Vb_estm2_x (the latest value) and the first estimated value Vb_estm1_x (the latest value) of the vehicle system overall center of gravity.

The center-of-gravity displacement estimator 35 further carries out, by an arithmetic section 35d, the processing for multiplying the difference by a gain (−Kp) of a predetermined value thereby to determine the latest value of the X-axis direction center-of-gravity displacement amount estimated value Ofst_estm_x.

The processing for determining the Y-axis direction center-of-gravity displacement amount estimated value Ofst_estm_y is carried out in the same manner as described above. More specifically, the block diagram illustrating the determination processing is obtained by interchanging the suffixes "_x" and "_y" in FIG. 9 and replacing the sign "+" of the acceleration component (the acceleration component generated by a centrifugal force), which is one of the inputs to an adder 35e and which is on the right side in the diagram, with "−."

Sequentially updating and determining the center-of-gravity displacement amount estimated value Ofst_estm_xy by the processing carried out by the center-of-gravity displacement estimator 35 makes it possible to determine Ofst_estm_xy such that Ofst_estm_xy converges to an actual value.

The reference desired velocity determiner 211 then carries out the processing by the center-of-gravity displacement influence amount calculator 36 illustrated in FIG. 5 thereby to calculate a center-of-gravity displacement influence amount Vofs_xy.

The center-of-gravity displacement influence amount Vofs_xy indicates the deviation of an actual velocity from a desired velocity of the vehicle system overall center of gravity when feedback control is conducted without considering the deviation of the position of the vehicle system overall center of gravity from the position of the reference portion Ps_xy in the inverted pendulum model in the attitude control arithmetic unit 34, which will be discussed later.

The center-of-gravity displacement influence amount calculator 36 multiplies each component of a newly determined center-of-gravity displacement amount estimated value Ofst_estm_xy by a value denoted by (Kth_xy/(h−r_xy))/Kvb_xy so as to calculate the center-of-gravity displacement influence amount Vofs_xy.

Incidentally, Kth_xy denotes a gain value for determining a manipulated variable component that functions to bring the tilt angle of the saddle unit 5 close to zero in the processing carried out by the attitude control arithmetic unit 34, which will be discussed later. Further, Kvb_xy denotes a gain value for determining a manipulated variable component that functions to bring the difference between a desired velocity of the vehicle system overall center of gravity Vb_cmd_xy and the first estimated value of the velocity of the vehicle system overall center of gravity Vb_estm1_xy close to zero in the processing by the attitude control arithmetic unit 34, which will be discussed later.

The first control processing unit 21 then carries out the processing by the center-of-gravity desired velocity determiner 32 illustrated in FIG. 5 thereby to calculate a post-limiting center-of-gravity desired velocity Vb_cmd_xy on the basis of the basic velocity command Vjs_xy determined by the operation command converter 31 and the center-of-gravity displacement influence amount Vofs_xy determined by the center-of-gravity displacement influence amount calculator 36.

The center-of-gravity desired velocity determiner 32 first carries out the processing by a processing section 32c illustrated in FIG. 5. The processing section 32c carries out dead-zone processing and limitation processing related to the value of the center-of-gravity displacement influence amount Vofs_xy thereby to determine a desired center-of-gravity velocity addition amount Vb_cmd_by_ofs_xy as a component based on the center-of-gravity displacement amount of a desired velocity of the vehicle system overall center of gravity.

To be specific, according to the present embodiment, if the magnitude of the X-axis direction center-of-gravity displacement influence amount Vofs_x is a value within the dead zone, which is a predetermined range in the vicinity of zero (a value relatively close to zero), then the center-of-gravity desired velocity determiner 32 sets the X-axis direction desired center-of-gravity velocity addition amount Vb_cmd_by_ofs_x to zero.

Further, if the magnitude of the X-axis direction center-of-gravity displacement influence amount Vofs_x is a value that deviates from the dead zone, then the center-of-gravity desired velocity determiner 32 determines the X-axis direction desired center-of-gravity velocity addition amount Vb_cmd_by_ofs_x such that the Vb_cmd_by_ofs_x has the same polarity as that of Vofs_x and the magnitude thereof increases as the magnitude of Vofs_x increases. However, the value of the X-axis direction desired center-of-gravity velocity addition amount Vb_cmd_by_ofs_x is limited to the range defined by a predetermined upper limit value (>0) and a predetermined lower limit value (≤0). The processing for determining the Y-axis direction desired center-of-gravity velocity addition amount Vb_cmd_by_ofs_y is carried out in the same manner as described above.

Subsequently, the center-of-gravity desired velocity determiner 32 carries out, by a processing section 32d illustrated in FIG. 5, the processing for determining a desired velocity V1_xy obtained by adding the components of the desired center-of-gravity velocity addition amount Vb_cmd_by_ofs_xy to the components of the basic velocity command Vjs_xy determined by the operation command converter 31. More specifically, V1_xy (more specifically, a set of V1_x and V1_y) is determined by the processing denoted by V1_x=Vjs_x+Vb_cmd_by_ofs_x and V1_y=Vjs_y+Vb_cmd_by_ofs_y.

Further, the center-of-gravity desired velocity determiner 32 carries out the processing by a processing section 32e. The processing section 32e carries out limit processing whereby to determine the post-limiting center-of-gravity desired velocity Vb_cmd_xy (a set of Vb_cmd_x and Vb_cmd_y), which is the desired velocity of the vehicle system overall center of gravity obtained by limiting the combination of the desired velocities V1_x and V1_y so as to prevent the rotational velocities of the electric motors 8a and 8b, which act as the actuator unit 8 of the first traveling motion unit 3, from deviating from a predetermined permissible range.

In this case, if the set of the desired velocities V1_x and V1_y determined by the processing section 32d exists in a predetermined range on a coordinate system having the value of the desired velocity V1_x on the axis of ordinate and the value of the desired velocity V1_y on the axis of abscissa, then the desired velocity V1_xy will be directly determined as the post-limiting center-of-gravity desired velocity Vb_cmd_xy.

Further, if the set of the desired velocities V1_x and V1_y determined by the processing section 32d deviates from the predetermined range on the coordinate system, then the desired velocity V1_xy limited to a set on the boundary of the predetermined range will be determined as the post-limiting center-of-gravity desired velocity Vb_cmd_xy.

As described above, the center-of-gravity desired velocity Vb_cmd_xy is determined on the basis of the basic velocity command Vjs_xy and the center-of-gravity displacement influence amount Vofs_xy (or the center-of-gravity displacement amount Ofst_xy). This enables the rider to steer the vehicle 1 by operating an operating device (operating the joystick 12) and/or changing the posture of the rider's body (moving his or her weight).

Supplementarily, the joystick 12, for example, may be eliminated, and the desired center-of-gravity velocity addition amount Vb_cmd_by_ofs_xy may be directly determined as the desired velocity V1_xy of the vehicle system overall center of gravity.

Alternatively, the basic velocity command Vjs_xy determined by the operation command converter 31 may be directly determined as the desired velocity V1_xy of the vehicle system overall center of gravity.

As another example, instead of operating the joystick 12, a mobile terminal, such as a smartphone, may be operated to make it possible to determine the basic velocity command Vjs_xy or the desired velocity V1_xy.

After the processing is carried out by the center-of-gravity desired velocity determiner 32 as described above, the reference desired velocity determiner 211 then carries out the processing of the attitude control arithmetic unit 34. The attitude control arithmetic unit 34 determines, by the processing illustrated by the block diagram of FIG. 5, the reference desired velocity Vw1_cmd1_xy of the first traveling motion unit 3 such that the attitudes of the saddle unit 5 and the base frame 2 are stabilized.

More specifically, the attitude control arithmetic unit 34 first carries out, by an arithmetic section 34b, the processing for deducting the components of the center-of-gravity displacement influence amount Vofs_xy from the components of the post-limiting center-of-gravity desired velocity Vb_cmd_xy thereby to determine a post-compensation center-of-gravity displacement desired velocity Vb_cmpn_cmd_xy.

Subsequently, the attitude control arithmetic unit 34 carries out the processing by arithmetic sections excluding the arithmetic section 34b and an integration arithmetic section 34a, which performs integral calculation, so as to calculate a desired translational acceleration in the X-axis direction DVw1_cmd_x and a desired translational acceleration in the Y-axis direction DVw1_cmdy of a desired translational acceleration DVw1_cmd_xy, which is a desired value of the translational acceleration of a ground contact point of the first traveling motion unit 3, according to expressions (4a) and (4b) given below.

$$DVw1\_cmd\_x = Kvb\_x \cdot (Vb\_cmpn\_cmd\_x - Vb\_estm1\_x) - Kth\_x \cdot \theta b\_act\_x - Kw\_x \cdot \omega b\_act\_x \quad (4a)$$

$$DVw1\_cmd\_y = Kvb\_y \cdot (Vb\_cmpn\_cmd\_y - Vb\_estm1\_y) - Kth\_y \cdot \theta b\_act\_y - Kw\_y \cdot \omega b\_act\_y \quad (4b)$$

In expressions (4a) and (4b), Kvb_xy, Kth_xy, and Kw_xy denote predetermined gain values set in advance.

Further, the first term of the right side of expression (4a) denotes a feedback manipulated variable component based on the difference between the post-compensation center-of-gravity displacement desired velocity in the X-axis direction Vb_cmpn_cmd_x (a latest value) of the vehicle system overall center of gravity and a first estimated value Vb_estm1_x (a latest value), the second term denotes a feedback manipulated variable component based on a measurement value (a latest value) of the actual tilt angle θb_act_x in the direction about the Y-axis of the saddle unit 5, and the third term denotes a feedback manipulated variable component based on a measurement value (a latest value) of the actual tilt angular velocity ωb_act_x in the direction about the Y-axis direction of the saddle unit 5. Further, the desired translational acceleration in the X-axis direction DVw1_cmd_x is calculated as a resultant manipulated variable of the above feedback manipulated variable components.

Similarly, the first term of the right side of expression (4b) denotes a feedback manipulated variable component based on the difference between the post-compensation center-of-gravity displacement desired velocity in the Y-axis direction Vb_cmpn_cmd_y (a latest value) of the vehicle system overall center of gravity and a first estimated value Vb_estm1_y (a latest value), the second term denotes a feedback manipulated variable component based on a measurement value (a latest value) of the actual tilt angle θb_act_y in the direction about the X-axis of the saddle unit 5, and the third term denotes a feedback manipulated variable component based on a measurement value (a latest value) of the actual tilt angular velocity ωb_act_y in the direction about the X-axis direction of the saddle unit 5. Further, the desired translational acceleration in the Y-axis direction DVw1_cmd_y is calculated as a resultant manipulated variable of the above feedback manipulated variable components.

The foregoing expressions (4a) and (4b) can be rewritten to expressions (4a)' and (4b)', respectively, given below.

$$DVw1\_cmd\_x = Kvb \cdot (Vb\_cmd\_x - Vb\_estml\_x) - \quad (4a)'$$
$$Kth \cdot (Ofst\_estm\_x/(h - r\_x) + \theta b\_act\_x) - Kw\_x \cdot \omega b\_act\_x$$

$$DVw1\_cmd\_y = Kvb \cdot (Vb\_cmd\_y - Vb\_estml\_y) - \quad (4b)'$$
$$Kth \cdot (Ofst\_estm\_y/(h - r\_y) + \theta b\_act\_y) - Kw\_y \cdot \omega b\_act\_y$$

In this case, the second term of the right side of each of expressions (4a)' and (4b)' has a meaning as a feedback manipulated variable component for setting the actual position of the vehicle system overall center of gravity in the X-axis direction and the Y-axis direction at a position right above the ground contact portion of the first traveling motion unit 3.

Subsequently, the attitude control arithmetic unit 34 integrates the components of the desired translational acceleration DVw1_cmd_xy by the integration arithmetic section 34a thereby to determine the reference desired velocity Vw1_cmd1_xy (a latest value) of the first traveling motion unit 3.

The processing by the reference desired velocity determiner 211 is carried out as described above at each arithmetic processing cycle. By the processing, the reference desired velocity Vw1_cmd1_xy of the first traveling motion unit 3 is determined to make it possible to converge the moving velocity of the vehicle system overall center of gravity (the moving velocity in the horizontal direction) to the post-limiting center-of-gravity desired velocity Vb_cmd_xy while maintaining the stable attitudes of the saddle unit 5 and the base frame 2 of the vehicle 1 on the assumption that the idling of the first traveling motion unit 3 (the idling caused by the slippage of the first traveling motion unit 3 with respect to a floor surface) will not occur.

Supplementarily, the reference desired velocity determiner 211 corresponds to the reference desired motion determiner in the present invention. In this case, the desired translational acceleration DVw1_cmd_xy or the reference desired velocity Vw1_cmd1_xy, which is obtained by integrating the desired translational acceleration DVw1_cmd_xy, corresponds to the reference desired motion in the present invention.

Figure 10:
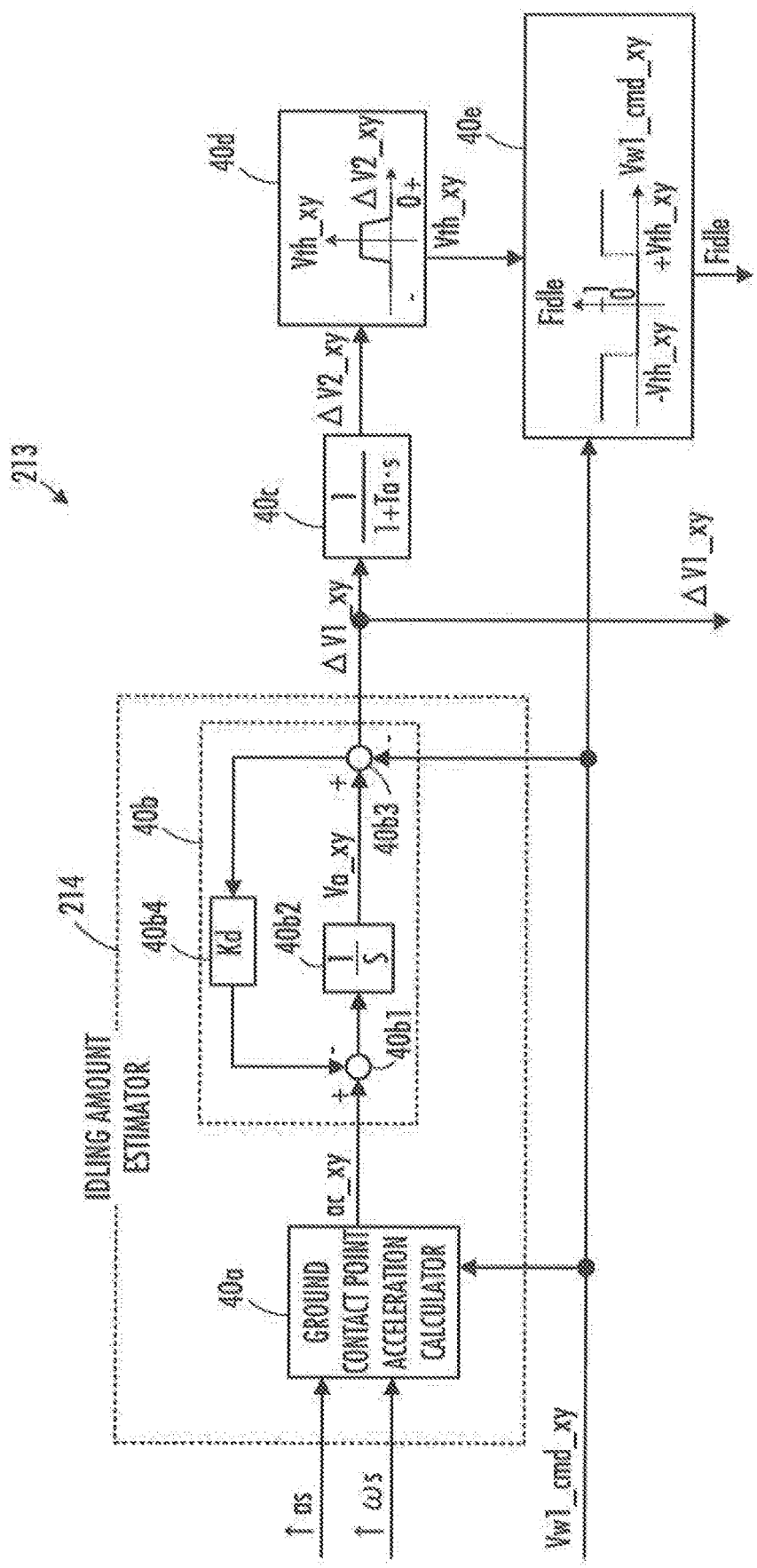
FIG. 10 is a block diagram illustrating the processing carried out by a travel stop determiner illustrated in FIG. 4.

Referring now to FIG. 10, the processing by the travel stop determiner 213 will be described. The travel stop determiner 213 first carries out the processing by the idling amount estimator 214 at each arithmetic processing cycle. The idling amount estimator 214 estimates the actual translational acceleration (the translational acceleration in the X-axis direction and the Y-axis direction ac_xy) of a ground contact point of the first traveling motion unit 3 by a ground contact point acceleration calculator 40a.

The ground contact point acceleration calculator 40a calculates the estimated value of an actual acceleration vector ↑ac of the ground contact point of the first traveling motion unit 3 according to expression (5) given below by using the acceleration vector ↑as, which is obtained by coordinate-converting an acceleration vector indicated by a detection signal of the acceleration sensor 50 (the acceleration vector observed in a sensor coordinate system set with respect to the acceleration sensor 50) into a global coordinate system (the foregoing XYZ-coordinate system) on the basis of the measurement value of the tilt angle of the base frame 2, an angular velocity vector ↑ωs, which is obtained by coordinate-converting an angular velocity vector indicated by a detection signal of the angular velocity sensor 51 (the angular velocity vector observed in a sensor coordinate system set with respect to the angular velocity sensor 51) into the foregoing global coordinate system on the basis of the measurement value of the tilt angle of the base frame 2, and an estimated value of the actual outer peripheral velocity vector ↑Vw1 at the ground contact point of the first traveling motion unit 3.

Then, the ground contact point acceleration calculator 40a obtains a component in the X-axis direction ac_x and a component in the Y-axis direction ac_y of the acceleration vector ↑ac as the estimated values of the component in the X-axis direction and the component in the Y-axis direction of the actual translational acceleration of the ground contact point of the first traveling motion unit 3. A symbol "↑" in a reference character, such as the foregoing "↑as," denotes a vector amount. Further, a symbol "x" in expression (5) denotes a vector product (a cross product).

$$\uparrow ac = \uparrow as - \uparrow hs \times (d \uparrow \omega s/dt) - \uparrow Vw1 \times \uparrow \omega s \quad (5)$$

In expression (5), d↑ωs/dt denotes the temporal change rate (i.e., the angular acceleration vector) of the angular velocity vector ↑ωs, and ↑hs denotes the position vector of the acceleration sensor 50 observed from the ground contact point of the first traveling motion unit 3. The position vector ↑hs is defined by the measurement value of the tilt angle of the base frame 2 and the position of the acceleration sensor 50 in the base frame 2.

Further, the outer peripheral velocity vector ↑Vw1 of the first traveling motion unit 3 is, more specifically, the translational velocity vector of the outer periphery of the first traveling motion unit 3 (the velocity vector in the horizontal direction at the ground contact point), which is mechanically specified according to the actual rotational velocities of the electric motors 8a, 8b by the power transmission mechanism between the electric motors 8a, 8b and the first traveling motion unit 3. If there is no slip between the first traveling motion unit 3 and a floor surface, then the outer peripheral velocity vector ↑Vw1 coincides with the travel velocity vector in the horizontal direction of the first traveling motion unit 3.

Further, according to the present embodiment, the actual desired rotational velocities of the electric motors 8a, 8b are determined on the basis of the desired velocity Vw1_cmd_xy, which denotes the desired value of the translational travel velocity in the X-axis direction and the Y-axis direction of the first traveling motion unit 3 finalized by the desired velocity finalizer 215. Further, the actual desired rotational velocities of the electric motors 8a, 8b are fed back to control the desired rotational velocities. Thus, the set of the component in the X-axis direction and the component in the Y-axis direction of the outer peripheral velocity vector ↑TVw1 of the first traveling motion unit 3 can be regarded to coincide or substantially coincide with the desired velocity Vw1_cmd_xy.

In the present embodiment, therefore, a vector, the component of which in the X-axis direction and the component of which in the Y-axis direction coincide with the desired velocity Vw1_cmd_xy in a preceding arithmetic processing cycle and the component of which in the Z-axis direction is set to zero, is used as the outer peripheral velocity vector ↑TVw1 of the right side of expression (5). Hence, the desired velocity Vw1_cmd_xy (a previous value) of the first traveling motion unit 3 is input to the ground contact point acceleration calculator 40a, as illustrated in FIG. 10.

However, as an alternative, for example, the component in the X-axis direction and the component in the Y-axis direction of the outer peripheral velocity vector ↑Vw1 may be estimated from the measurement values of the rotational velocities of the electric motors 8a, 8b indicated by the outputs of the rotational velocity sensors 52a, 52b, and the estimated values may be used, in place of the desired velocity Vw1_cmd_xy, for the processing by the ground contact point acceleration calculator 40a.

The idling amount estimator 214 basically integrates, by an integration arithmetic section 40b2 of a processing unit 40b, the components of a ground contact point acceleration ac_xy calculated by the ground contact point acceleration calculator 40a, thereby calculating the estimated value of an actual ground contact point velocity Va_xy of the first traveling motion unit 3 (the actual translational velocity of the first traveling motion unit 3). Then, the idling amount estimator 214 subtracts, by an arithmetic section 40b3, the components of the desired velocity Vw1_cmd_xy (a previous value), which denotes the estimated value of the set of the component in the X-axis direction and the component in the Y-axis direction of the outer peripheral velocity vector ↑Vw1 of the first traveling motion unit 3, from the components of the estimated value of the ground contact point velocity Va_xy, thereby calculating the estimated value of an idling amount ΔV1_xy (an amount of idling in the X-axis direction ΔV1_x and an amount of idling in the Y-axis direction ΔV1_y) of the first traveling motion unit 3.

According to the present embodiment, however, in order to prevent the divergence of a value of the integral (the ground contact point velocity Va_xy) attributable to the influence of the drift of an output of the acceleration sensor 50, in the processing for calculating the estimated value of the ground contact point velocity Vc_xy of the first traveling motion unit 3 in the processing unit 40b, the idling amount estimator 214 carries out, by an arithmetic section 40b1, the processing for subtracting a value, which is obtained by multiplying each component of the previous value (a value calculated in a preceding arithmetic processing cycle) of the estimated value of the idling amount ΔV1_xy by a predetermined gain value Kd by an arithmetic section 40b4, from the components of an estimated value (a latest value) of the ground contact point acceleration ac_xy. Further, the idling amount estimator 214 sequentially integrates the output value of the arithmetic section 40b1 by the integration arithmetic section 40b2 thereby to calculate the estimated value of the ground contact point velocity Va_xy of the first traveling motion unit 3.

Thus, the estimated value of the ground contact point velocity Va_xy is calculated to gradually approximate to the desired velocity Vw1_cmd_xy. This consequently compensates for the influence of the drift of the output of the acceleration sensor 50. In other words, steady offset of the idling amount ΔV1_xy to a non-zero value due to the influence of the drift will be prevented.

The travel stop determiner 213 determines whether to stop the traveling motion of the first traveling motion unit 3 by using the estimated value of the idling amount ΔV1_xy calculated as described above as an index that indicates the degree of the idling of the first traveling motion unit 3.

To be specific, the travel stop determiner 213 sets velocity threshold values Vth_xy (Vth_x and Vth_y), by a processing section 40d, according to the components of a filtered value ΔV2_xy obtained by carrying out the processing that uses a filter 40c having a low-pass characteristic on each component of the estimated value of the idling amount ΔV1_xy (filtering with a transfer function denoted by (1/(1+Ta·S)) in the illustrated example).

In the velocity threshold value Vth_xy, Vth_x denotes a threshold value related to the translational velocity in the X-axis direction and Vth_y denotes a threshold value related to the translational velocity in the Y-axis direction, respectively, of the first traveling motion unit 3. Vth_x and Vth_v of the velocity threshold value Vth_xy are set according to a map prepared in advance in relation to the processing section 40d, as illustrated in the drawing. In this case, if the magnitude (in an absolute value) of the filtered value ΔV2_x of the X-axis direction idling amount ΔV1_x excessively increases to a certain value or more, then the X-axis direction velocity threshold value Vth_x is set to zero. Further, if the magnitude (in an absolute value) of the filtered value ΔV2_x is relatively small, then Vth_x is set to increase to a maximum positive value as the magnitude of ΔV2_x decreases. The same applies to the Y-axis direction velocity threshold value Vth_y.

Further, the travel stop determiner 213 determines, by a processing section 40e, whether the desired velocity Vw1_cmd_x (a previous value) and Vw1_cmd_y (a previous value), which denote the current estimated value of the actual outer peripheral velocity (the translational velocity in the horizontal direction) at the ground contact point of the first traveling motion unit 3 fall within a permissible range defined by −Vth_x<Vw1_cmd_x<+Vth_x and a permissible range defined by −Vth_y<Vw1_cmd_yv<+Vth_y, respectively. Then, depending on the determination result, the travel stop determiner 213 sets the value of a flag Fidle, which is set to 1 or 0, indicating whether to stop the travel motion of the first traveling motion unit 3.

In this case, if one of the desired velocity in the X-axis direction Vw1_cmd_x (a previous value) and the desired velocity in the Y-axis direction Vw1_cmd_y (a previous value) deviates from the foregoing permissible ranges, then the travel stop determiner 213 sets the value of the flag Fidle to 1 to stop the travel motion of the first traveling motion unit 3.

Further, if the desired velocity in the X-axis direction Vw1_cmd_x (a previous value) and the desired velocity in the Y-axis direction Vw1_cmd_y (a previous value) both fall within the foregoing permissible ranges, then the travel stop determiner 213 sets the value of the flag Fidle to zero to allow the travel motion of the first traveling motion unit 3.

The processing by the travel stop determiner 213 is carried out as described above. In this case, if the magnitude of the filtered value ΔV2_x or ΔV2_y of the components of the idling amount ΔV1_xy excessively increases to a certain value or more, then the velocity threshold value Vth_x or Vth_y is set to zero. Hence, the desired velocity Vw1_cmd_x (a previous value) or Vw1_cmd_y (a previous value) deviates from the permissible ranges, thus causing the value of the flag Fidle to be set to 1.

Figure 11:
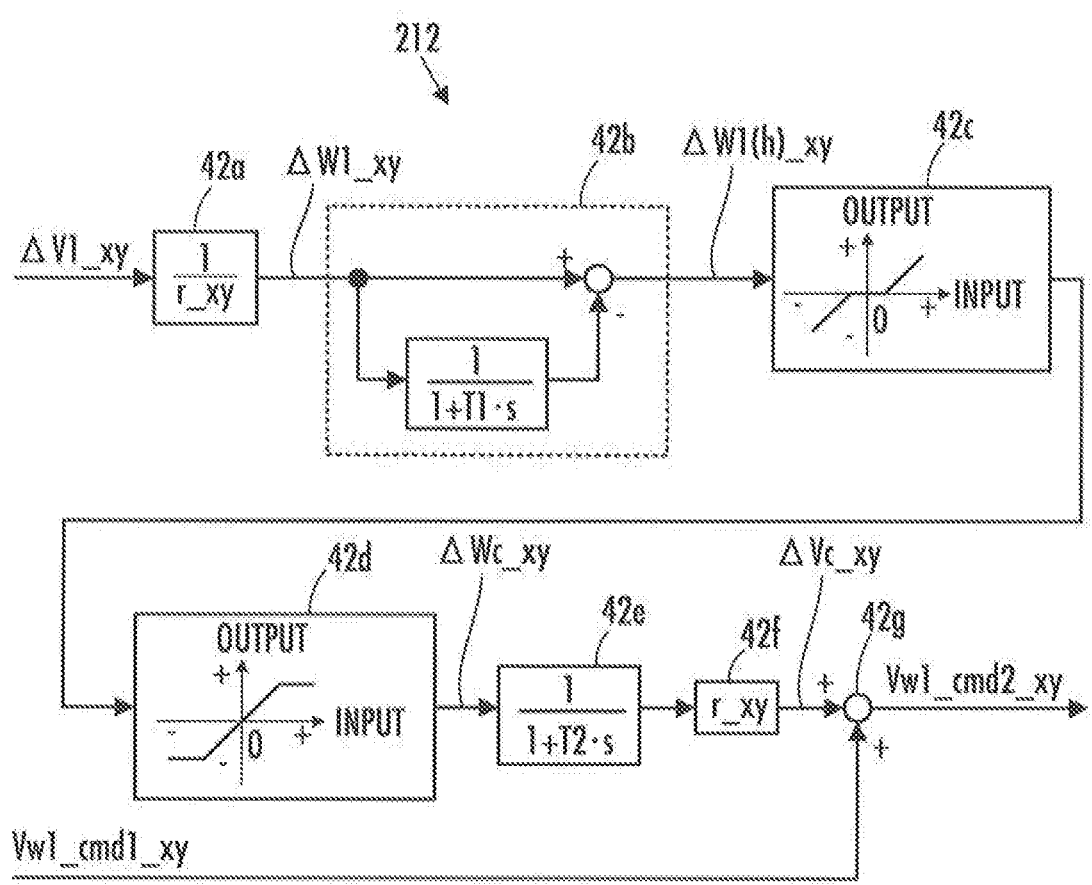
FIG. 11 is a block diagram illustrating the processing carried out by a velocity-at-idling regulator illustrated in FIG. 4.

Referring now to FIG. 11, the processing by the velocity-at-idling regulator 212 will be described. The velocity-at-idling regulator 212 sequentially receives the idling amount ΔV1_xy calculated by the idling amount estimator 214 of the travel stop determiner 213.

Further, in each arithmetic processing cycle, the velocity-at-idling regulator 212 first divides, by a processing section 42a, the components of the idling amount ΔV1_xy by radii r_x and r_y of the foregoing virtual wheels 61_x and 61_y, respectively, thereby converting the components of the idling amount ΔV1_xy into an idling amount ΔW1_xy of the rotational angular velocity (hereinafter referred to as "the angular velocity idling amount ΔW1_xy) of each of the virtual wheels 61_x and 61_y.

Then, the velocity-at-idling regulator 212 carries out low-cut filtering on each component of the angular velocity idling amount ΔW1_xy by a processing section (a low-cut filter) 42b, thereby extracting a high-frequency component of each component of the angular velocity idling amount ΔW1_xy.

In this case, the processing section 42b, for example, subtracts a value, which is obtained by carrying out the low-pass filtering (the filtering in which the transfer function is denoted by $(1/(1+T1 \cdot S))$ in the illustrated example) on the components of the angular velocity idling amount ΔW1_xy (a component in the direction about the Y-axis ΔW1_x and a component in the direction about the X-axis ΔW1_y), from each component of the angular velocity idling amount ΔW1_xy thereby to extract a high-frequency component ΔW1(h)_xy of the angular velocity idling amount ΔW1_xy. In this case, the high-frequency component ΔW1(h)_xy is a high-frequency component of a predetermined frequency or more specified by a time constant T1 of the transfer function of the foregoing low-pass filtering.

Subsequently, the velocity-at-idling regulator 212 carries out the processing by a dead zone processing section 42c and the processing by a limiting section 42d in sequence on each of the high-frequency components ΔW1(h)_x and ΔW1(h)_y so as to determine angular velocity correction amounts ΔWc_x and ΔWc_y, which are the correction amounts of the rotational angular velocities of the virtual wheels 61_x and 61_y, respectively.

In this case, as illustrated by the diagram of FIG. 11, the processing carried out by the dead zone processing section 42c on the high-frequency component ΔW1(h)_x is the processing for outputting zero in the case where ΔW1(h)_x is a value in a predetermined dead zone in the vicinity of zero, or the processing for outputting a value which is obtained by subtracting a boundary value of the dead zone (a boundary value, which is an upper limit value or a lower limit value of the dead zone, whichever is closer to ΔW1(h)_x) from ΔW1(h)_x in the case where ΔW1(h)_x is a value that deviates from the dead zone. The same applies to the processing carried out by the dead zone processing section 42c on ΔW1(h)_y. The range of the dead zone with respect to ΔW1(h)_x and the range of the dead zone with respect to ΔW1(h)_y are usually different from each other.

Further, as illustrated by the diagram of FIG. 11, the processing by the limiting section 42d carried out on the high-frequency component ΔW1(h)_x is the processing for directly outputting an output value of the dead zone processing section 42c in the case where the output value of the dead zone processing section 42c is a value in a predetermined permissible range, or the processing for outputting a boundary value, which is an upper limit value or a lower limit value of the permissible range, whichever is closer to the output value of the dead zone processing section 42c in the case where the output value of the dead zone processing section 42c is a value that deviates from the predetermined permissible range. The same applies to the processing carried out by the limiting section 42d on ΔW1(h)_y. The permissible range with respect to ΔW1(h)_x and the permissible range with respect to ΔW1(h)_y are usually different from each other.

Subsequently, the velocity-at-idling regulator 212 carries out the low-pass filtering (the filtering in which the transfer function is denoted by $(1/(1+T2 \cdot S))$ in the illustrated example) by a processing section 42e on the angular velocity correction amounts ΔWc_x and ΔWc_y, which are the outputs of the limiting section 42d. Further, the velocity-at-idling regulator 212 multiplies the filtered values ΔWc_x and ΔWc_y by the radii r_x and r_y of the virtual wheels 61_x and 61_y, respectively, by a processing section 42f, thereby converting the filtered values of the angular velocity correction amounts ΔWc_x and ΔWc_y into an X-axis direction translational velocity correction amount ΔVc_x and a Y-axis direction translational velocity correction amount ΔVc_y, respectively.

The low-pass filtering carried out by the processing section 42e is the filtering for removing noise components of high frequencies that are higher than the frequency range of the idling amount ΔV1_xy used to regulate the velocity of the first traveling motion unit 3. Hence, the time constant T2 in the filtering is set to a value equal to or smaller than the time constant T1 in the filtering by the processing section (low-cut filter) 42b.

The translational velocity correction amounts ΔVc_x and ΔVc_y determined as described above are the correction amounts (≤0) for decreasing the desired velocity Vw1_cmd of the first traveling motion unit 3 to be lower than the reference desired velocity Vw1_cmd1 so as to clear or decrease the high-frequency components of the idling amount ΔV1_xy in the case where the actual idling of the first traveling motion unit 3 occurs and the high-frequency components of the idling amount ΔV1_xy become large.

Then, the velocity-at-idling regulator 212 carries out, by a processing section 42g, the processing for adding the components of the translational velocity correction amounts ΔVc_xy to the components of the reference desired velocity Vw1_cmd1_xy thereby to determine a post-correction desired velocity Vw1_cmd2xy obtained by correcting the reference desired velocity Vw1_cmd1_xy.

The processing by the velocity-at-idling regulator 212 is carried out as described above. Supplementarily, according to the present embodiment, the processing by the combination of the idling amount estimator 214 and the processing sections 42a, 42b of the velocity-at-idling regulator 212 implement the high-frequency idling state amount calculator in the present invention.

In this case, a ground contact point velocity Va_xy calculated by the integration arithmetic section 40b2 of the processing unit 40b of the idling amount estimator 214 corresponds to the measurement value of the actual travel velocity of the traveling motion unit (the first traveling motion unit 3) in the present invention, a previous value of the desired velocity Vw1_cmd_xy of the first traveling motion unit 3 corresponds to an estimated value of the no-slip state travel velocity in the present invention, and the idling amount ΔV1_xy calculated by the arithmetic section 40b3 of the processing unit 40b of the idling amount estimator 214 corresponds to a velocity difference in the present invention.

Further, the angular velocity idling amount ΔW1_xy calculated by the processing section 42a of the velocity-at-idling regulator 212 corresponds to a velocity difference function value in the present invention, and the high-frequency components ΔW1(h)_xy obtained by the processing section (the low-cut filter) 42b correspond to a high-frequency idling state amount in the present invention.

Further, the translational velocity correction amounts ΔVc_xy calculated by the processing section 42f of the velocity-at-idling regulator 212 corresponds to a correction amount in the present invention. The desired motion corrector in the present invention is implemented by the processing carried out by the processing section 42g.

In the present embodiment, if the foregoing processing by the velocity-at-idling regulator 212 has led to the occurrence of the idling of the first traveling motion unit 3, then the post-correction desired velocity Vw1_cmd2_xy is determined such that the magnitude of each component of the post-correction desired velocity Vw1_cmd2_xy decreases to be smaller than the magnitude of each component of the reference desired velocity Vw1_cmd1_xy by the translational velocity correction amount ΔVc_xy determined according to the high-frequency components of the idling amount ΔV_xy (the prompt change components of the idling amount ΔV1_xy typically observed immediately after the idling of the first traveling motion unit 3 starts).

Figure 12A:
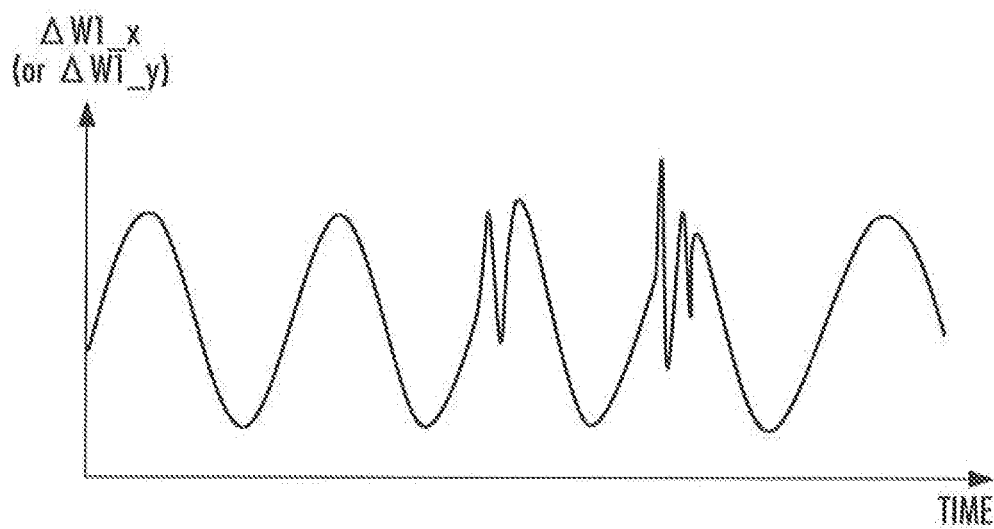
FIG. 12A and FIG. 12B are graphs for explaining the processing carried out by the velocity-at-idling regulator illustrated in FIG. 4.
Figure 12B:
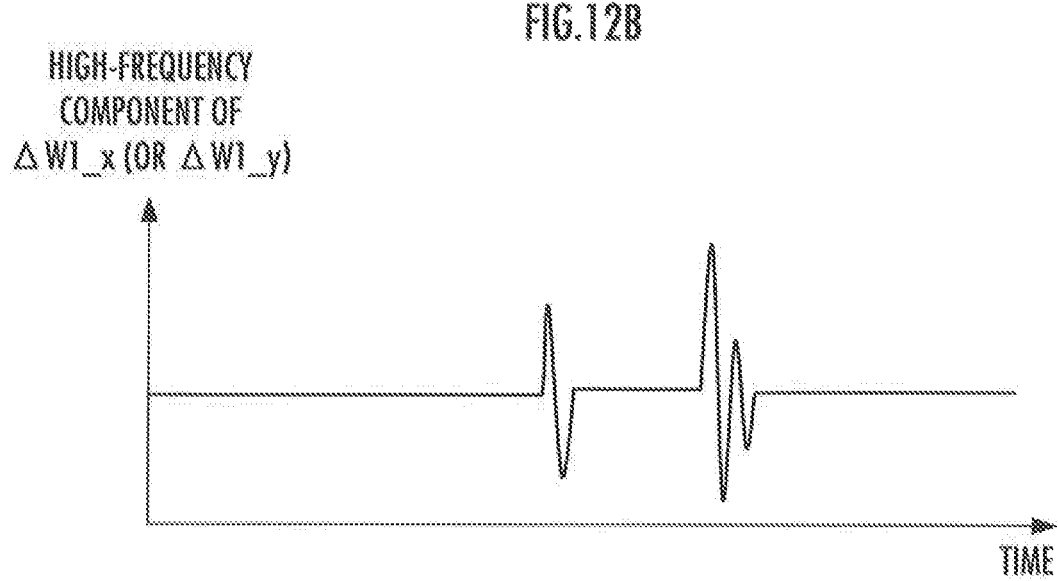

For example, as illustrated in FIG. 12A, in the case where the angular velocity idling amount ΔW1_x (or ΔW1_y) changes, the high-frequency component W1(h)_x (or W1(h)_y) extracted by the processing section (the low-cut filter) 42b will have a waveform illustrated in FIG. 12B. Then, the translational velocity correction amount ΔVc_x (or ΔVc_y) is determined on the basis of the high-frequency component W1(h)_x (or W1(h)_y).

Meanwhile, if, for example, the X-axis direction idling amount ΔV1_x does not include a high-frequency component, then the high-frequency components W1(h)_xy output from the processing section (the low-cut filter) 42b will be zero or substantially zero. Therefore, even if the idling amount ΔV1_x includes a steady (or low-frequency) offset component due to the drift of an output of the acceleration sensor 50 or an accumulated integration error in the processing by the integration arithmetic section 40b2 of the idling amount estimator 214, the high-frequency components W1(h)_x will be zero or substantially zero in the case where no actual idling of the first traveling motion unit 3 is occurring or the idling is minor. As a result, the X-axis direction translational velocity correction amount ΔVc_x will be zero or substantially zero. This applies also to the Y-axis direction idling amount ΔV1_y.

Thus, according to the present embodiment, if the high-frequency component of the X-axis direction idling amount ΔV1_x or the Y-axis direction idling amount ΔV_y grows large due to the occurrence of the actual idling of the first traveling motion unit 3, then each of the translational velocity correction amounts ΔVc_x and ΔVc_y is calculated such that the high-frequency component is promptly cleared or reduced.

Further, in a situation in which no actual idling of the first traveling motion unit 3 is occurring or the idling is minor, even if the estimated value of a component of the idling amount ΔV1_xy calculated by the idling amount estimator 214 includes a steady (or low-frequency) offset component due to the drift of an output of the acceleration sensor 50 or an integration error, the calculation of the translational velocity correction amount ΔVc_x or ΔVc_y based thereon will be prevented.

Supplementarily, in the processing by the velocity-at-idling regulator 212 in the present embodiment, the idling amount ΔV1_xy has been converted into the angular velocity idling amount ΔW1_xy by the processing section 42a and then the processing by the processing sections 42b to 42f has been carried out thereby to calculate the translational velocity correction amount ΔVc_xy. Alternatively, however, for example, the processing by the processing sections 42a and 42f may be omitted, and the same processing as that carried out by the processing sections 42b to 42e may be carried out on each component of the idling amount ΔV1_xy to calculate the translational velocity correction amount ΔVc_xy.

Further, the translational velocity correction amount ΔVc_xy may be determined on the basis of a value obtained by multiplying the high-frequency component of the idling amount ΔV1_xy or the angular velocity idling amount ΔW1_xy by a gain of a predetermined value, or a differential value of the high-frequency component, or a value of the integral of the high-frequency component, or a treated value (a constant value) of the same polarity as the polarity of a high-frequency component, or a value obtained by linearly combining the values of two or more types of the above four types of values.

The first control processing unit 21 carries out the processing by the travel stop determiner 213 and the velocity-at-idling regulator 212 as described above in each arithmetic processing cycle and then carries out the processing by the desired velocity finalizer 215. The desired velocity finalizer 215 determines the desired velocity Vw1_cmd_xy such that each component of the desired velocity Vw1_cmd_xy of the first traveling motion unit 3 is slowly decreased (gradually attenuated) from a current value (a previous value) to zero so as to gradually stop the first traveling motion unit 3 in the case where the value of the flag Fidle determined by the travel stop determiner 213 is 1, as illustrated in FIG. 4. In this case, the desired velocity Vw1_cmd_xy is determined such that, for example, the magnitude of the travel velocity of the first traveling motion unit 3 is attenuated to zero while maintaining the travel direction of the first traveling motion unit 3 constant.

Further, the desired velocity finalizer 215 directly finalizes the post-correction desired velocity Vw1_cmd2_xy determined by the velocity-at-idling regulator 212 as the desired velocity Vw1_cmd_xy in the case where the value of the flag Fidle determined by the travel stop determiner 213 is 0.

The desired velocity finalizer 215 finalizes the desired velocity Vw1_cmd_xy of the first traveling motion unit 3 as described above. Then, the first control processing unit 21 controls the electric motors 8a, 8b such that the actual travel velocity of the first traveling motion unit 3 follows the desired velocity Vw1_cmd_xy determined as described above.

Figure 13:
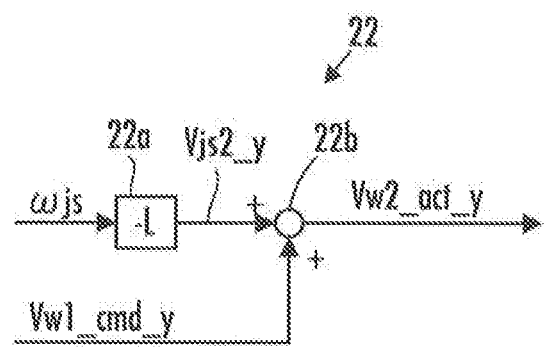
FIG. 13 is a block diagram illustrating the processing carried out by a second control processing unit illustrated in FIG. 3.

Referring now to FIG. 13, the processing by the second control processing unit 22 will be described. The second control processing unit 22 determines the desired velocity Vw2_cmd_y, which is the desired value of the travel velocity (the translational velocity) in the Y-axis direction of the second traveling motion unit 4, such that the desired velocity Vw2_cmd_y coincides with the desired velocity in the Y-axis direction Vw1_cmd_y of the first traveling motion unit 3 in order to perform the translational travel of the vehicle 1 in a situation in which the turning angular velocity command ωjs determined by the operation command converter 31 is zero (a situation in which the amount of pivot in the Y-axis direction Js_y of the joystick 12 is zero or substantially zero).

Further, in a situation in which the turning angular velocity command ωjs is not zero, the second control processing unit 22 determines the desired velocity in the Y-axis direction Vw2_cmd_y of the second traveling motion unit 4 to be different from the desired velocity in the Y-axis direction Vw1_cmd_y of the first traveling motion unit 3 so as to cause the vehicle 1 to turn.

More specifically, the processing by the second control processing unit 22 is carried out as described below. Referring to FIG. 13, the second control processing unit 22 first carries out the processing by an arithmetic section 22a. The arithmetic section 22a multiplies the turning angular velocity command ωjs by the value of (−1)-times a distance L in the X-axis direction between the first traveling motion unit 3 and the second traveling motion unit 4. Thus, the second control processing unit 22 determines a relative velocity command Vjs2_y, which is the command value of the relative velocity in the Y-axis direction of the second traveling motion unit 4 with respect to the first traveling motion unit 3 in order to turn the vehicle 1 at an angular velocity of the turning angular velocity command a ωjs.

Then, the second control processing unit 22 carries out, by an arithmetic section 22b, the processing for adding the foregoing relative velocity command Vjs2_y (a latest value) to the desired velocity in the Y-axis direction Vw1_cmd_y (a latest value) of the first traveling motion unit 3 determined by the first control processing unit 21, thereby determining the desired velocity in the Y-axis direction Vw2_cmd_y of the second traveling motion unit 4.

Then, the second control processing unit 22 controls the electric motor 17 such that the actual travel velocity in the Y-axis direction of the second traveling motion unit 4 follows the desired velocity Vw2_cmd_y determined as described above.

According to the embodiment described above, if a high-frequency component of the estimated value of the idling amount ΔV1_x or ΔV_y occurs due to the occurrence of actual idling of the first traveling motion unit 3, then the desired velocity Vw1_cmd_xy obtained by correcting the reference desired velocity Vw1_cmd1_xy is determined to promptly clear or reduce the high-frequency component (such that the outer peripheral velocity of the first traveling motion unit 3 specified by the desired velocity Vw1_cmd_xy approaches to an actual ground contact point velocity). Then, the travel velocity of the first traveling motion unit 3 is controlled so as to reach the desired velocity Vw1_cmd_xy.

Thus, the idling of the first traveling motion unit 3 is promptly clear or reduced immediately after the idling occurs, so that the frictional force that can be generated between the first traveling motion unit 3 and a floor surface is restored. As a result, basically, the first traveling motion unit 3 can promptly restore the state in which the first traveling motion unit 3 can travel at the reference desired velocity Vw1_cmd1_xy. This enables the vehicle 1 to continue to travel while maintaining the stable attitudes of the saddle unit 5 and the base frame 2.

For example, the experiments performed by the inventors of the present application have verified that, when the vehicle 1 is moved to ride over a step on the floor surface, even if the first traveling motion unit 3 idles, the idling is quickly cleared or reduced, thus more frequently enabling the vehicle 1 to continue to travel. It has been also verified that, if, for example, the first traveling motion unit 3 idles while the vehicle 1 is being reciprocated in the Y-axis direction relatively rapidly, the idling is quickly cleared or reduced, enabling the vehicle 1 to continue to reciprocate in the Y-axis direction.

Further, according to the vehicle 1 of the present embodiment, even if the estimated value of the idling amount ΔV1_x or ΔV1_y includes a steady (or low-frequency) offset component due to the drift of an output of the acceleration sensor 50 or an accumulated integration error, the translational velocity correction amount ΔVc_xy will be zero or a very small value in a situation in which no idling of the first traveling motion unit 3 is occurring or the idling is minor.

For this reason, the first traveling motion unit 3 can be moved at a velocity that coincides or substantially coincides with the reference desired velocity V1_cmd1_xy unless the foregoing offset component becomes larger, causing the value of the flag Fidle to be set to 1.

Accordingly, the vehicle 1 is enabled to continue to travel as much as possible while maintaining the stable attitudes of the saddle unit 5 and the base frame 2.

Second Embodiment

A description will now be given of a second embodiment of the present invention with reference to FIG. 14. The present embodiment differs from the first embodiment only in the processing by a velocity-at-idling regulator 212. Therefore, the description of the present embodiment will be focused mainly on the aspects that are different from the first embodiment, and the description of the same aspects as those of the first embodiment will be omitted.

Figure 14:
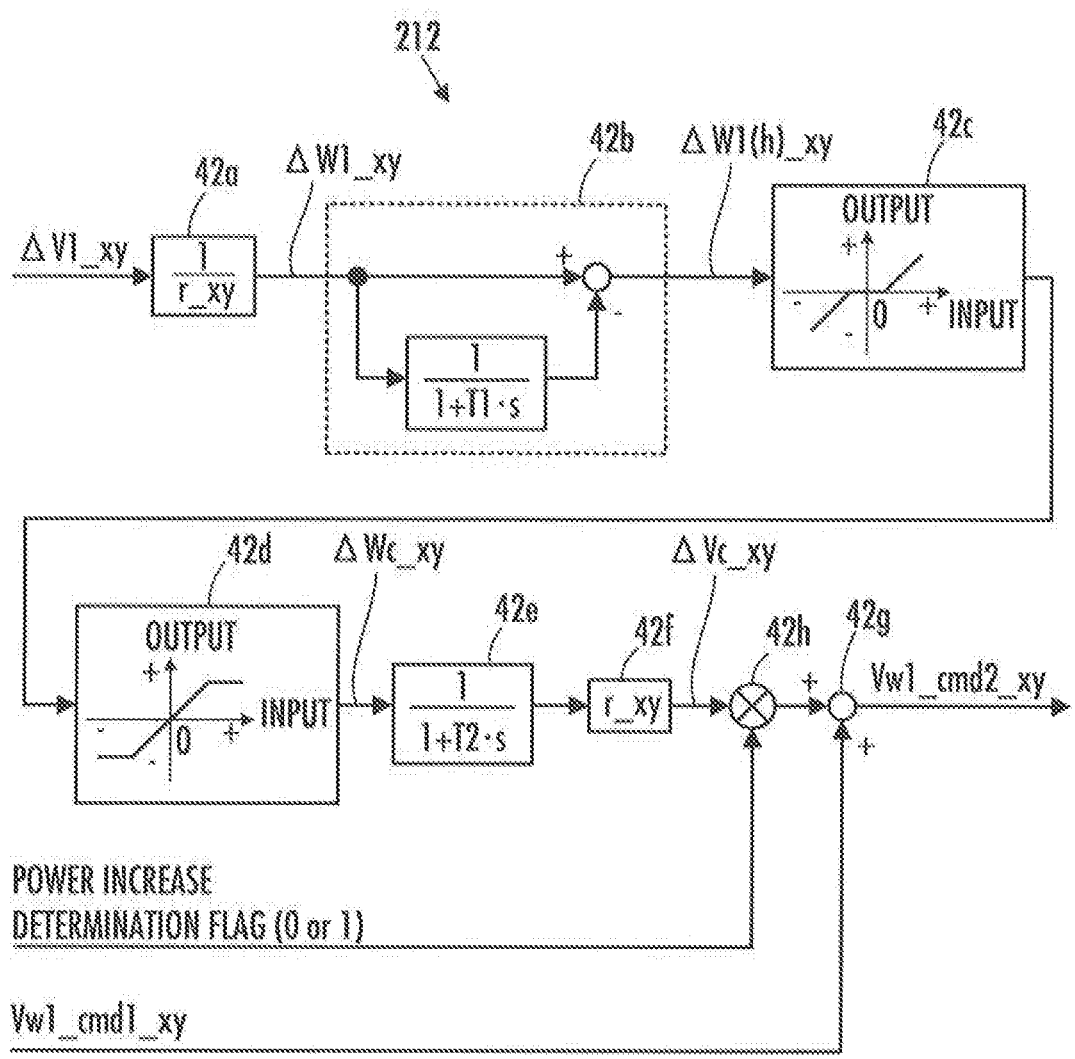
FIG. 14 is a block diagram illustrating another example of the processing carried out by the velocity-at-idling regulator.

Referring to FIG. 14, regarding the processing carried out by the velocity-at-idling regulator 212 in the present embodiment, the processing from a processing section 42a to a processing section 42f is the same as that of the first embodiment. According to the present embodiment, the velocity-at-idling regulator 212 determines, as a translational velocity correction amount ΔVc_xy, a value that is obtained by multiplying, by a processing section 42h, each component of an output of the processing section 42f by a value of a power increase determination flag (=0 or 1) set as will be discussed later. Then, the velocity-at-idling regulator 212 carries out the processing, by a processing section 42g, for adding the components of the translational velocity correction amount ΔVc_xy determined as described above to the components of a reference desired velocity Vw1_cmd1_xy, thereby determining a post-correction desired velocity Vw1_cmd2_xy obtained by correcting the reference desired velocity Vw1_cmd1_xy.

In a situation wherein a driving force to be applied to a first traveling motion unit 3 from electric motors 8a, 8b is rising (increasing), there is a likelihood that the idling of a first traveling motion unit 3 occurs, causing the high-frequency components of an idling amount ΔV1_xy to become large. According to the present embodiment, therefore, the velocity-at-idling regulator 212 determines a post-correction desired velocity Vw1_cmd2_xy such that the idling of the first traveling motion unit 3 is prevented, provided that the driving force to be applied to the first traveling motion unit 3 is rising (the driving force is increasing).

More specifically, the velocity-at-idling regulator 212 determines, for each of an X-axis direction and a Y-axis direction, whether the driving force to be applied to the first traveling motion unit 3 is rising (increasing) in each of the directions according to the detection values or the command values of the energizing currents of the electric motors 8a, 8b. Further, the velocity-at-idling regulator 212 sets the value of the power increase determination flag to 1 or 0, depending on whether the determination result is affirmative or not.

Whether the driving force is rising is determined, for example, as described below. Based on the detection values or command values of the energizing currents of the electric motors 8a, 8b, the driving force in the X-axis direction and the driving force in the Y-axis direction to be applied to the first traveling motion unit 3 are estimated for each arithmetic processing cycle. In this case, regarding the driving force in the X-axis direction, the driving force that causes the first traveling motion unit 3 to travel in the positive direction of the X-axis is defined as a positive driving force, and the driving force that causes the first traveling motion unit 3 to travel in the negative direction of the X-axis is defined as a negative driving force. The same applies to the driving force in the Y-axis direction.

Further, for each of the X-axis direction and the Y-axis direction, the product of an estimated value of the driving force and a temporal change rate thereof (a differential value) is calculated for each arithmetic processing cycle. If the value of the product is a positive value, then it is determined that the driving force in that particular direction is rising. Further, if the value of the product is zero or a negative value, then it is determined that the driving force in that particular direction is not rising.

Thus, the determination can be properly performed. The present embodiment is the same as the first embodiment except for the aspect described above.

Supplementarily, in the present embodiment, processing sections 42h, 42g implement the desired motion corrector in the present invention.

In such an embodiment, the correction of a desired velocity Vw1_cmd_xy of the first traveling motion unit 3 from a reference desired velocity Vw1_cmd1_xy can be limited only to a situation wherein the idling of the first traveling motion unit 3 is apt to occur.

Therefore, correcting the desired velocity Vw1_cmd_xy of the first traveling motion unit 3 from the reference desired velocity Vw1_cmd1_xy can be limited to a bare minimum. The present embodiment can provide the same effects as those of the first embodiment except for the above.

Third Embodiment

Figure 15:
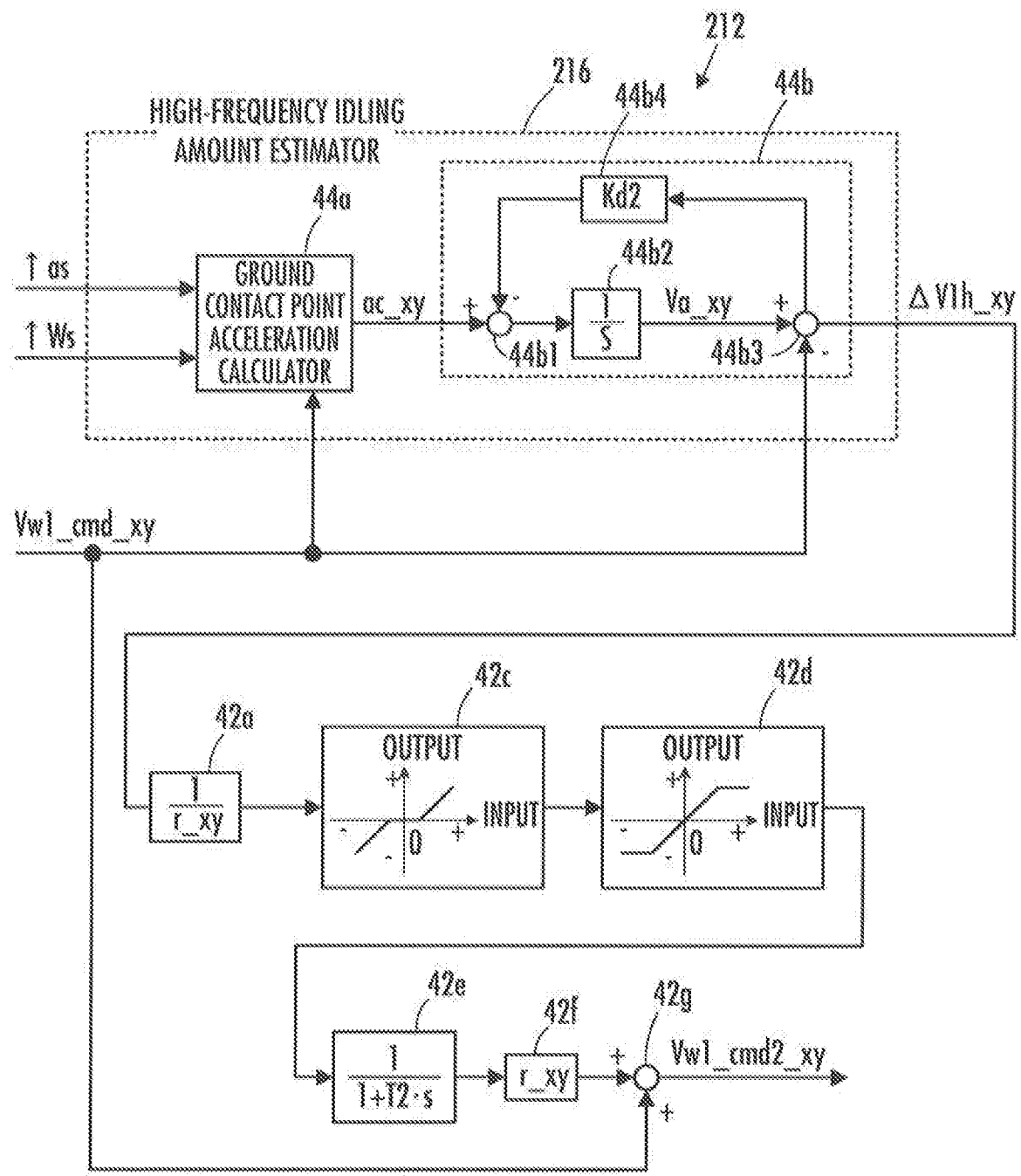
FIG. 15 is a block diagram illustrating another example of the processing carried out by the velocity-at-idling regulator.

Referring now to FIG. 15, a third embodiment of the present invention will be described. The present embodiment differs from the first embodiment only in the processing carried out by a speed-at-idling regulator 212. Therefore, the description of the present embodiment will be focused mainly on the aspects that are different from the first embodiment, and the description of the same aspects as those of the first embodiment will be omitted.

Referring to FIG. 15, the speed-at-idling regulator 212 in the present embodiment includes a high-frequency idling amount estimator 216 which determines an idling amount ΔV1(h)_xy in a high-frequency range of a first traveling motion unit 3 by the processing obtained by partly modifying the processing carried out by the foregoing idling amount estimator 214.

The high-frequency idling amount estimator 216 carries out, by a ground contact point acceleration calculator 44a, the same processing as the processing carried out by the ground contact point acceleration calculator 40a of the idling amount estimator 214 in the first embodiment, thereby to calculate the estimated value of a translational acceleration ac_xy of the ground contact point of the first traveling motion unit 3.

Further, the high-frequency idling amount estimator 216 determines the idling amount ΔV1(h)_xy in the high-frequency range of the first traveling motion unit 3 by the processing carried out by a processing unit 44b, which is partly different from the processing unit 40b of the idling amount estimator 214 in the first embodiment, on the basis of the estimated value of the translational acceleration ac_xy of the ground contact point of the first traveling motion unit 3 and the previous value of the desired velocity Vw1_cmd_xy corresponding to the estimated value of the outer peripheral velocity (the velocities in the X-axis direction and the Y-axis direction) of the first traveling motion unit 3.

In this case, the processing unit 44b has arithmetic sections 44b1 to 44b4, which carry out the same arithmetic processing as that carried out by the arithmetic sections 40b1 to 40b4 of the processing unit 40b in the first embodiment. In the present embodiment, however, a gain value Kd2 by which the previous value of the idling amount ΔV1(h)_xy is multiplied in the arithmetic section 44b4 is set to be larger than the gain value Kd used in the arithmetic section 40b4 in the first embodiment.

Thus, setting the gain value Kd2 in the arithmetic section 44b4 to a larger value causes the idling amount ΔV1(h)_xy, which is calculated by the processing unit 44b, to become equivalent to a component in a high-frequency range of a predetermined frequency or higher in the idling amount of the first traveling motion unit 3. According to the present embodiment, therefore, a component in the high-frequency range of the idling amount ΔV1(h)_xy of the first traveling motion unit 3 is directly obtained by the processing carried out by the high-frequency idling amount estimator 216.

In the processing carried out by the high-frequency idling amount estimator 216, the ground contact point acceleration calculator 44a may be omitted, and the translational acceleration ac_xy calculated by the ground contact point acceleration calculator 40a of the idling amount estimator 214 may be directly input to the processing unit 44b to calculate the idling amount ΔV1(h)_xy.

Further, according to the present embodiment, the speed-at-idling regulator 212 sequentially carries out the processing, by the processing sections 42a and 42c to 42f described in the first embodiment, on the idling amount ΔV1(h)_xy determined by the high-frequency idling amount estimator 216 as described above, thereby determining a post-correction desired velocity Vw1_cmd2_xy of the first traveling motion unit 3. In this case, the idling amount ΔV1(h)_xy determined by the high-frequency idling amount estimator 216 is the component in the high-frequency range. Hence, the filtering by the processing section (the low-cut filter) 42b described in the first embodiment is not required.

The present embodiment is the same as the first embodiment except for the aspects described above. Supplementarily, in the present embodiment, the high-frequency idling amount estimator 216 corresponds to the high-frequency idling state amount calculating unit in the present invention. Further, the processing by the ground contact point acceleration calculator 44a corresponds to the first processing in the present invention, the processing by the arithmetic section 44b1 corresponds to the second processing in the present invention, and the processing by the arithmetic section 44b3 corresponds to the third processing in the present invention.

According to the present embodiment, the idling amount ΔV1(h)_xy of the high-frequency component can be determined without the need for the processing section (the low-cut filter) 42b (or a high-pass filter) described above. Further, the present embodiment can provide the same effects as those of the first embodiment except for the above.

Other Embodiments

The present invention is not limited to the first to the third embodiments described above. For example, in the foregoing embodiments, the vehicle 1 provided with the saddle unit 5 for a rider (person) to ride on the vehicle 1 has been described. However, the inverted pendulum type vehicle according to the present invention may alternatively be a vehicle provided with a mounting unit for carrying an object, in place of the saddle unit 5.

Further, the saddle unit 5 may be configured such that, for example, a rider stands with his or her both feet placed thereon rather than being limited to the seat on which the rider sits.

Further, the inverted pendulum type vehicle may have a structure in which, for example, the first traveling motion unit 3, the second traveling motion unit 4, and the base frame 2 do not tilt, and the saddle unit 5 (or an object mounting unit) is tiltably attached to the base frame 2.

Further, in the foregoing embodiments, the turning angular velocity command ωjs as the desired angular velocity in the yaw direction of the vehicle 1 has been determined according to the operation of the joystick 12. Alternatively, however, the turning angular velocity command ωjs may be determined on the basis of, for example, the Y-axis direction center-of-gravity displacement amount estimated value Ofst_estm_y or the Y-axis direction center-of-gravity displacement influence amount Vofs_y.

What is claimed is:

1. An inverted pendulum type vehicle having a traveling motion unit capable of traveling on a floor surface, an actuator unit that drives the traveling motion unit, a base to which the traveling motion unit and the actuator unit are assembled, an object mounting unit assembled to the base such that the object mounting unit is tiltable with respect to a vertical direction, and a control unit that controls an operation of the actuator unit, the inverted pendulum type vehicle comprising:
   a reference desired motion determiner that sequentially determines a reference desired motion of the traveling motion unit, the reference desired motion stabilizing an attitude of the object mounting unit;
   a high-frequency idling state amount calculating unit that performs either one of: a sequential calculation of a high-frequency idling state amount which is a high-frequency component of a predetermined frequency or more of a velocity difference between a measurement value of an actual travel velocity of the traveling motion unit and an estimated value of a no-slip state travel velocity, which is an estimated value of the travel velocity of the traveling motion unit defined according to an operation state of the actuator unit in a case where it is assumed that there is no slip between the traveling motion unit and the floor surface; and a sequential calculation of the high-frequency idling state amount, which is a high-frequency component of the predetermined frequency or more of a velocity difference function value having a function characteristic that monotonically changes in relation to the velocity difference; and
   a desired motion correction unit which corrects the reference desired motion by a correction amount which is determined so as to reduce the high-frequency component of the velocity difference or the high-frequency component of the velocity difference function value, based on the high-frequency idling state amount,
   wherein the control unit is configured to control the actuator unit according to a desired motion obtained by correcting the reference desired motion by the desired motion correction unit, and
   wherein the high-frequency idling state amount calculating unit is configured to sequentially carry out, at a predetermined arithmetic processing cycle, first processing for measuring a translational acceleration of the traveling motion unit by using a detection signal of an inertial sensor, which includes at least an acceleration sensor mounted on the inverted pendulum type vehicle, second processing for calculating an estimated value of a translational velocity of the traveling motion unit by integrating a difference between a measurement value of the translational acceleration and a value obtained by multiplying the high-frequency component of a previously calculated velocity difference by a gain of a predetermined value, and third processing for calculating a difference between the translational velocity and the estimated value of the no-slip state travel velocity as the high-frequency component of the velocity difference, and the value of the gain is set beforehand such that the high-frequency component of the velocity difference calculated by the third processing will be a high-frequency component of a frequency range of the predetermined frequency or more.

2. The inverted pendulum type vehicle according to claim 1,
   wherein the desired motion correction unit is configured to determine the correction amount of the reference desired motion according to one or more parameters, which are a value of the high-frequency idling state amount, a differential value of the high-frequency idling state amount, a value of the integral of the high-frequency idling state amount, and a polarity of the high-frequency idling state amount.

3. The inverted pendulum type vehicle according to claim 1,
   wherein the desired motion correction unit is configured to correct the reference desired motion, provided that a predetermined condition regarding a drive state of the traveling motion unit is satisfied.

4. The inverted pendulum type vehicle according to claim 3,
   wherein the predetermined condition is a condition in which the drive state of the traveling motion unit is a state in which a driving force applied from the actuator unit to the traveling motion unit is increasing.

* * * * *